(12) United States Patent
Barber et al.

(10) Patent No.: US 10,100,131 B2
(45) Date of Patent: Oct. 16, 2018

(54) CHEMICAL PULPING OF CHITINOUS BIOMASS FOR CHITIN

(71) Applicant: The Board of Trustees of the University of Alabama, Tuscaloosa, AL (US)

(72) Inventors: Patrick S. Barber, Tuscaloosa, AL (US); Chris S. Griggs, Vicksburg, MS (US); Robin D. Rogers, Tuscaloosa, AL (US); Gabriela Gurau, Tuscaloosa, AL (US); Julia L. Shamshina, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 128 days.

(21) Appl. No.: 14/837,881

(22) Filed: Aug. 27, 2015

(65) Prior Publication Data

US 2016/0060363 A1    Mar. 3, 2016

Related U.S. Application Data

(60) Provisional application No. 62/042,392, filed on Aug. 27, 2014.

(51) Int. Cl.
*C08B 37/08* (2006.01)
*C08L 5/08* (2006.01)

(52) U.S. Cl.
CPC .............. *C08B 37/003* (2013.01); *C08L 5/08* (2013.01)

(58) Field of Classification Search
None
See application file for complete search history.

(56) References Cited

U.S. PATENT DOCUMENTS

| | | |
|---|---|---|
| 1,943,176 A | 1/1934 | Graenacher |
| 3,892,731 A | 7/1975 | Austin |
| 4,063,017 A | 12/1977 | Tsao et al. |
| 4,097,666 A | 6/1978 | Johnson et al. |
| 4,188,263 A | 2/1980 | Hulsmann et al. |
| 4,520,105 A | 5/1985 | Sinner et al. |
| 4,522,934 A | 6/1985 | Shum et al. |
| 4,970,156 A | 11/1990 | Avrameas et al. |
| 5,077,414 A | 12/1991 | Arduengo et al. |
| 5,679,146 A | 10/1997 | Kalt et al. |
| 5,683,832 A | 11/1997 | Bonhote et al. |
| 5,714,536 A | 2/1998 | Ziolo et al. |
| 5,747,125 A | 5/1998 | Markulin et al. |
| 5,792,399 A | 8/1998 | Meister et al. |
| 5,827,602 A | 10/1998 | Koch et al. |
| 5,836,910 A | 11/1998 | Duffy et al. |
| 5,836,970 A | 11/1998 | Pandit et al. |
| 5,856,513 A | 1/1999 | Ue et al. |
| 6,124,273 A | 9/2000 | Drohan et al. |
| 6,376,712 B2 | 4/2002 | Narizuka et al. |
| 6,451,220 B1 | 9/2002 | Ziolo et al. |
| 6,515,075 B1 | 2/2003 | Balogh et al. |
| 6,613,310 B1 | 9/2003 | Campbell et al. |
| 6,808,557 B2 | 10/2004 | Holbrey et al. |
| 6,824,599 B2 | 11/2004 | Swatloski et al. |
| 6,846,924 B1 | 1/2005 | Malmgren et al. |
| 6,939,974 B2 * | 9/2005 | Earle .................... C07D 231/12 548/347.1 |
| 7,198,026 B2 | 4/2007 | Mausta et al. |
| 7,198,695 B2 | 4/2007 | Kettenbach et al. |
| 7,253,289 B2 | 8/2007 | Ren et al. |
| 7,550,520 B2 | 6/2009 | Daly et al. |
| 8,030,030 B2 | 10/2011 | Paripati et al. |
| 8,038,840 B2 | 10/2011 | Li et al. |
| 8,044,120 B2 | 10/2011 | D'Andola et al. |
| 8,110,667 B2 | 2/2012 | Zhang et al. |
| 8,182,557 B2 | 5/2012 | Argyropoulos |
| 8,986,501 B2 * | 3/2015 | Li ............................ D21C 3/04 162/141 |
| 9,096,743 B2 | 8/2015 | Qin et al. |
| 9,683,309 B2 | 6/2017 | Swatloski et al. |
| 2001/0024716 A1 | 9/2001 | Chen et al. |
| 2002/0010291 A1 | 1/2002 | Murphy |

(Continued)

FOREIGN PATENT DOCUMENTS

| CA | 2479941 | 10/2003 |
|---|---|---|
| CH | 153446 | 6/1932 |

(Continued)

OTHER PUBLICATIONS

Pinkert, A., Marsh, K. N., & Pang, S. (2010). Alkanolamine ionic liquids and their inability to dissolve crystalline cellulose. Industrial & Engineering Chemistry Research, 49(22), 11809-11813.*
ISR and WO for PCT/2006/020941 dated Feb. 27, 2008.
ISR and WO for PCT/US2005/010235, dated Jan. 3, 2007.
ISR and WO for PCT/US2006/24863 dated Jan. 3, 2007.
ISR and WO for PCT/US2009/01066 dated Jun. 22, 2009.
ISR and WO for PCT/US2009/64105 dated Jan. 13, 2010.
ISR and WO for PCT/US2010/036904 dated Jan. 3, 2011.

(Continued)

*Primary Examiner* — Shaojia A Jiang
*Assistant Examiner* — Dale R Miller
(74) *Attorney, Agent, or Firm* — Meunier Carlin & Curfman LLC

(57) ABSTRACT

Methods of separating chitin from a chitinous biomass that contains chitin and non-chitin material by a chemical pulping process that uses a protic ionic liquid or a composition comprising acid and base precursor molecules are described. Also described are methods for purifying chemically pulped chitin resulting in a pure chitin material with a high molecular weight and a higher degree of acetylation in comparison to traditional pulping and ionic liquid extraction based methods.

21 Claims, 8 Drawing Sheets

(56) References Cited

U.S. PATENT DOCUMENTS

| | | |
|---|---|---|
| 2002/0056633 A1 | 5/2002 | Westman |
| 2003/0059604 A1 | 3/2003 | Hattori et al. |
| 2003/0157351 A1 | 8/2003 | Swatloski et al. |
| 2003/0165445 A1 | 9/2003 | Malnou et al. |
| 2003/0233742 A1 | 12/2003 | Jones et al. |
| 2004/0038031 A1 | 2/2004 | Holbrey et al. |
| 2004/0077519 A1 | 4/2004 | Price et al. |
| 2005/0058694 A1 | 3/2005 | Nielsen |
| 2005/0061457 A1 | 3/2005 | Skuratowicz et al. |
| 2005/0123851 A1 | 6/2005 | Shinbori et al. |
| 2005/0194561 A1 | 9/2005 | Davis |
| 2005/0196671 A1 | 9/2005 | Paonessa et al. |
| 2005/0285073 A1 | 12/2005 | Singh et al. |
| 2005/0288484 A1 | 12/2005 | Holbrey et al. |
| 2006/0118755 A1 | 6/2006 | Fujioka et al. |
| 2006/0128996 A1 | 6/2006 | Vaultier et al. |
| 2006/0194197 A1 | 8/2006 | Spangler et al. |
| 2006/0241287 A1 | 10/2006 | Hecht et al. |
| 2007/0006774 A1 | 1/2007 | Rogers et al. |
| 2007/0093462 A1 | 4/2007 | Rogers et al. |
| 2007/0112185 A1 | 5/2007 | Myllymaki et al. |
| 2007/0215300 A1 | 9/2007 | Upfal et al. |
| 2007/0225191 A1 | 9/2007 | Scheibel et al. |
| 2008/0023162 A1 | 1/2008 | Myllymaki et al. |
| 2008/0097001 A1 | 4/2008 | Miraftab et al. |
| 2008/0190013 A1 | 8/2008 | Argyropoulos |
| 2008/0227162 A1 | 9/2008 | Varanasi et al. |
| 2008/0241536 A1 | 10/2008 | Luo et al. |
| 2009/0010983 A1 | 1/2009 | Melvik et al. |
| 2009/0088564 A1 | 4/2009 | Luo et al. |
| 2009/0099353 A1 | 4/2009 | Miraftab et al. |
| 2009/0215720 A1 | 8/2009 | Thibodeau et al. |
| 2009/0221813 A1 | 9/2009 | Moellmann et al. |
| 2010/0081798 A1 | 4/2010 | Balensiefer et al. |
| 2010/0087369 A1 | 4/2010 | Cutsem et al. |
| 2010/0112646 A1 | 5/2010 | Balensiefer et al. |
| 2010/0143435 A1 | 6/2010 | Dagger et al. |
| 2010/0170504 A1 | 7/2010 | Zhang et al. |
| 2010/0196967 A1 | 8/2010 | Edye et al. |
| 2010/0239673 A1 | 9/2010 | Linhardt et al. |
| 2010/0249432 A1 | 9/2010 | Siemer et al. |
| 2010/0287826 A1 | 11/2010 | Hoffman et al. |
| 2010/0319862 A1 | 12/2010 | Rahman et al. |
| 2011/0180951 A1 | 7/2011 | Teo et al. |
| 2012/0115729 A1* | 5/2012 | Qin .................... C08K 5/3445 504/358 |
| 2012/0216705 A1* | 8/2012 | Rogers .................... C08J 3/091 106/162.2 |
| 2012/0245336 A1 | 9/2012 | Daly et al. |
| 2014/0027938 A1 | 1/2014 | Swatloski et al. |

FOREIGN PATENT DOCUMENTS

| | | |
|---|---|---|
| CN | 1380110 | 11/2002 |
| DE | 2703703 | 1/1977 |
| EP | 0780391 | 6/1997 |
| EP | 0904433 | 3/1999 |
| EP | 1222918 | 7/2002 |
| EP | 1854786 | 11/2007 |
| JP | 58183601 | 10/1983 |
| JP | 63056501 | 3/1988 |
| JP | 64017649 | 1/1989 |
| JP | 80089796 | 4/1996 |
| JP | 10265674 | 10/1998 |
| JP | 2000314035 | 11/2000 |
| JP | 2002290011 | 10/2002 |
| JP | 2003171144 | 6/2003 |
| JP | 2003335887 | 11/2003 |
| WO | 994020521 | 9/1994 |
| WO | 1995021871 | 8/1995 |
| WO | 1996006593 | 3/1996 |
| WO | 2000032658 | 6/2000 |
| WO | 2001081436 | 11/2001 |
| WO | 2002079269 | 10/2002 |
| WO | 2002100360 | 12/2002 |
| WO | 2002102586 | 12/2002 |
| WO | 2003029329 | 4/2003 |
| WO | 2003041692 | 5/2003 |
| WO | 2003074031 | 9/2003 |
| WO | 2004027897 | 4/2004 |
| WO | 2005017252 | 2/2005 |
| WO | 2006097571 A1 | 9/2006 |
| WO | 2006116126 A2 | 11/2006 |
| WO | 2007005388 | 1/2007 |
| WO | 2007063327 | 6/2007 |
| WO | 2007111605 A1 | 10/2007 |
| WO | 2009105236 | 8/2009 |
| WO | 2010056790 | 5/2010 |
| WO | 2010141470 A2 | 12/2010 |
| WO | 2011056924 | 5/2011 |
| WO | 2014001856 A1 | 1/2014 |

OTHER PUBLICATIONS

ISR and WO for PCT/US2010055381 dated Aug. 2, 2011.
Non Final Office Action for U.S. Appl. No. 13/375,245 dated Aug. 13, 2014.
Office Action for U.S. Appl. No. 12/735,827 dated Feb. 6, 2013.
Office Action for U.S. Appl. No. 13/129,060 dated Apr. 8, 2013.
PCT/US14/34793, International Search Report and Written Opinion, dated Aug. 27, 2014.
Supplemental Search Report for EP4757863, dated May 12, 2009.
Al-Adhami, et al., "Immobilization of Wood-Rotting Fungi Laccases on Modified Cellulose and Acrylic Carriers", J. Process Biochemistry, 37:1387-1394 (2002).
Armstrong, et al., "Structure and properties of high stability germinal diatonic ionic liquids", J. Amer. Chem. Soc., 127(2), 593-604 (2005).
Ast, et al., "Efficient Assembly of Peptomers on Continuous Surfaces", Tetrahedron Lett., 40:4317-4318 (1999).
Axegard, "The Future Pulp Mill—A Biorefinery?", Presentation at 1st International Biorefinery Workshop, Washington, DC., Jul. 20-21, 2005.
Barber, et al., "A 'green' Industrial Revolution: Using Chitin towards Transformative Technologies", Pure Appl. Chem. 85, 1693-1701 (2013).
Barber, et al., "Electrospinning of Chitin Nanofibers Directly from an Ionic Liquid Extract of Shrimp Shells", Green Chem. 15, 601-607 (2013).
Barber, et al., "Surface Modification of Ionic Liquid-Spun Chitin Fibers for the Extraction of Uranium from Seawater: Seeking the Strength of Chitin and the Chemical Functionality of Chitosan", Green Chem. 16, 1828-1836 (2014).
Barber, Patrick S. , "Coagulation of Chitin and Cellulose from 1-Ethyl-3-methylimidazolium Acetate Ionic-Liquid Solutions Using Carbon Dioxide", Angew. Chem. Int. Ed., v. 52, 12350-12353 (2013).
Bartlett, et al., "Chitin, Cholera, and Competence", Science vol. 310, 1775-1777 (2005).
Benton, et al., "Effect of Room-Temperature Ionic Liquids as Replacements for Volatile Organic Solvents in Free-Radical Polymerization", Ionic Liquids, 818:125-133 (2002).
Biedron, et al., "onic Liquids as reaction Media for Polymeriazation Processes: Atom Transfer Radical Polymerization (ATRP) of Acrylates in Ionic Liquids", Polymer Int'l., 52(10):1584-1588 (2003).
Black, et al., "The estimation of chitin and chitin nitrogen in crawfish waste and derived products", Analyst, 75, 185-189 (1950).
Blankemeyer-Menge, et al., "Simultaneous Multiple Synthesis of Protected Peptide Fragments on 'Allyl'-Functionalized Cellulose Disc Supports", Tetrahedron Lett., 29:5871-5874 (1988).
Bonhote, et al., "Hydrophobic, Highly Conductive Ambient-Temperature Molten Salts", Inorg. Chem.,35:1168-1178 (1996).
Bora, et al., "A Simple Method for Functionalization of Cellulose Membrane for Covalent Immobilization of Biomolecules", J. Membr. Sci., 250:215-222 (2005).
Brugnerotto, et al., "An infrared investigation in relation with chitin and chitosan characterization", Polymer, 42, 3569-3580 (2001).

(56) References Cited

OTHER PUBLICATIONS

Cateto, et al., "Monitoring of lignin-based polyurethane synthesis by FTIR-ATR", Ind. Crops Prod., 27(2):168-174 (2008).
Cauchie et al., "An Attempt to estimate crustacean chitin production in the hydrosphere", Zoological Insitute.
Chesney, et al., "Amino-Derivatised Beaded Cellulose Gels, Novel Accessible and Biodegradable Scavenger Resins for Solution Phase Cominatorial Synthesis", Green Chem., 2:57-62 (2000).
Deng, et al., "Phase Diagram of [Amim]Cl + Salt Aqueous Biphasic Systems and Its Application for [Amim]Cl Recovery", J. Chem. Eng. Data 54, 2470-2473 (2009).
Earle, et al., "Ionic liquids. Green Solvents for the future", Pure Appl. Chem., 72(7):1391-1398 (2000).
El Seoud, et al., "Applications of ionic liquids in carbohydrate chemistry: A window of opportunities", Biomacromol, 8(9):2629-2647 (2007).
Endres, "Ionic Liquids: Solvents for the Eletrodeposition of Metals and Semiconductors", Chem. Phys. Chem., 3(2):144-154 (2002).
Erdmenger, et al., "Homogeneous tritylation of cellulose in 1-Butyl-3-methylimidazolium chlorideHomogeneous tritylation of cellulose in 1-Butyl-3-methylimidazolium chloride", Macromol. Biosci. 440-445 (2007).
Fannin, et al., "Properties of 1,3-Dialkylimidazolium Chloride-Aluminum Chloride Ionic Liquids. 2. Phase Transitions, Densities, Electrical Conductivities, and Viscosities", J. Phys. Chem., 88:2614-2621 (1984).
Fischer, et al., "Structural Changes of Cellulose Dissolved in Molten Salt Hydrates", 219th ACS National Meeting, San Francisco, CA (2000) (abstract).
Fort, et al., "Can ionic liquids dissolve wood? Processing and analysis of lignocellulosic materials with I-n-butyl-3-methylimidazolium chloride", Green Chem., 9:63-69 (2007).
Froehner, et al., "Properties of the Glycoprotein Laccase Immobilized by Two Methods", Acta Chem Scand B, 29:691-694 (1975).
Fukaya, et al., "Cellulose dissolution with polar ionic liquids under mild conditions: required factors for anions", Green Chem., 10:44-46 (2008).
Fukaya, et al., "Superior Solubility of Polysaccharides in Low Viscosity, Polar, and Halogen-Free 1,3-Dialkylimidazolium Formates", Biomacromolecules 7, 3295-3297 (2006).
Fukuyama, et al., "A Copper-Free Sonogashira Coupling Reaction in Ionic Liquids and Its Application to a Microflow System for Efficient Catalyst Recycling", Org. Lett., 4(10) 1691-1694 (2002).
Gallezot, "Process options for converting renewable feedstocks to bioproducts", Green Chem., 9:295-302 (2007).
Gelbrich, "Colloidal Structures Based on Topochemically Modified Cellulose", Papier (Heidelberg), 52:755-758 (1998).
Gemeiner, "Immobilized Enzymes, Organelles and Cells", Enzyme Engineering, Gemeiner, Ed., Ellis Horwood Series in Biochemistry and Biotechnology, Ellis Horwood Limited: West Sussex, England, pp. 158-179 (1992).
Gordon, et al., "Fused Organic Salts. 8. Properties of Molten Straight-Chain Isomers of Tetra-n-Pentylammonium Salts", J. Amer. Chem. Soc., 100(24):7445-7454 (1978).
Gutowski, "Controlling the Aqueous Miscibility of Ionic Liquids: Aqueous Biphasic Systems of Water-Miscible Ionic Liquids and Water-Structuring Salts for Recycle, Metathesis, and Separations", J. Am. Chem. Soc. 125, 6632-6633 (2003).
Harkin, et al., "Lignification in Trees: Indication of Exclusive Peroxidase Participation", Science, 180:296-98 (1973).
Hasegawa, et al., "New Pretreatment methods combining a hot water treatment and water/acetone extraction for thermo-chemical conversion of biomass", Energy and Fuels vol. 18, 755-760 (2004).
Heinze, et al., "Unconventional Methods in Cellulose Functionalization", Prog. Polym. Sci., 26:1689-1762 (2001).
Hirano, et al., "An Improved Method for the Preparation of Colloidal Chitin by using Methanesulfonic Acid", Agric. Biol. Chem. 52, 2111-2112 (1988).

Hirayama., "Rapid Confirmation and Revision of the Primary Structure of Bovine Serum Albumin by ESIMS and Frit-FAB LC/MS", Biochem. Biophys. Comm.,173:639-646 (1990).
Holbrey, et al., "The Phase Behaviour of 1-Alkyl-3-Methlimidazolium Tetrafluoroborates; Ionic Liquids and Ionic Liquid Crystals", J. Chem. Soc. Dalton Trans.,2133-2139 (1999).
Holbrey, John D. et al., ""Mercury(II) Partitioning from Aqueous Solutions with a New, Hydrophobic Ethylene-Glycol Functionalized Bis-Imidazolium Ionic Liquid,"", Green Chem., 5:129-135 5:129-135 (2003).
Hoogmoed, et al., "Fourier transform infrared spectroscopy studies of alginate—PLL capsules with varying compositions", J. Biomed. Mater. Res. A, 67 172-178 (2003).
Huddleston, et al., "Characterization and Comparison of Hydrophilic and Hydrophobic Room Temperature Ionic Liquids Incorporating the Imidazolium Cation", Green Chem., 3:156-164 (2001).
Huddleston, et al., "Room Temperature Ionic Liquids as Novel Media for 'Clean' Liquid-Liquid Extraction", Chem. Commun., 1765-1766 (1998).
Husemann, et al., "Homogeneous Acetylation of Cellulose", Buletinul Institutului Politehnic Din Iasi, 1(1-2):47-51 (1970) (abstract).
Illanes, et al., "Immobilization of Lactase and Invertase on Cross-linked Chitin", Bioreactor Immobilized Enzymes and Cells, Moo-Young, Ed., Elsevier Applied Science: London, 233-249 (1998).
Illanes, "Stability of Biocatalysts", Elec. J. Biotechnol., 2(1):1-9 (1999).
Jayakumar, et al.,"Biomedical applications of chitin and chitosan based nanomaterials—a short review" Carb. Polym., 82:227-232, (2010).
Kadokawa, et al., "A facile preparation of gel materials from a solution of cellulose in ionic liquid", Carbohydrate Research, 343, 769-772 (2008).
Kalra, et al., "Confined assembly of asymmetric block-copolymer nanofibers via multiaxial jet electrospinning", Small vol. 5, 2323-2332 (2009).
Kenealy, et al., "Pretreatments for Converting wood into paper and chemical, materials, chemicals and energy from forest biomass", Agryropoulos 25, 392-408 (2007).
Kilpelainen, et al., "Dissolution of wood in ionic liquids", J. Agric. Food Chem., 55:9142-9148 (2007).
Kirk-Othmer "Encyclopedia of Chemical Technology", Ed., 5:476-563 (1993).
Krajewska, "Application of Chitin- and Chitosan-based Materials for Enzyme Immobilizations: A Review", Enz. Microb. Techno., 35:126-139 (2004).
Kumar, et al., "A review of chitin and chitosan applications", React. Funct. Polym. 46, 1-27 (2000).
Lau, et al., "Dissolution of Candida Antarctica Lipase B in Ionic Liquids: Effects on Structure and Activity", Green Chem., 6:483-487 (2004).
Lawrie,"Interactions between alginate and chitosan biopolymers characterized using FTIR and XPS" Biomacromolecules 8, 2533-2541 (2007).
Lee, et al., "Ionic Liquid-Mediated Selective Extraction of Lignin from wood leading to enhanced enzymatic cellulose hydrolysis", Biotech. and Bioeng., 102(5):1368-1376 (2009).
Leipner, et al., "Structural Changes of Cellulose Dissolved in Molten Salt Hydrates", Macromol Chem Phys, 201(15):2041-2049 (2000).
Liebert, Tim F. et al., "Tailored Cellulose Esters: Synthesis and Structure Determination", Biomacromolecules, 6:333-40 (2005).
Linko, et al., "Cellulose Bead Entrapped Microbial Cells Biotechnical Applications", Enzyme Microb. Technol., 1:26-30 (1979).
Ma, et al., "Reverse Atom Transfer Radical Polymerization of Methyl Methacrylate in Room-Temperature Ionic Liquids", J. Polymer Sci. Pt. A—Polymer Chem., 41:143-151 (2003).
Mahmoud, et al., "Unconventional approach for demineralization of deproteinized crustacean shells for chitin production" Biochem. Biotechnol., 3:1-9, (2007).
Maia, et al., "Cellulose Organic Solvents. 1. The Structure of Anhydrous N-Methylmorpholine N-Oxide and N-Methylmorphline N-Oxide Monohydrate", Acta Cryst., B37:1858-1862 (1981).

(56) References Cited

OTHER PUBLICATIONS

Mais, et al., "Modification of Cellulose Using Cellulose p-Toluene-Sulfonates as Intermediates", Zeszyty Naukowe Politechniki Slaskiej Chemm., 140:121-125 (1999).
Manageeswaran, et al., "Degradation of indulin, a kraft pine lignin, by Serratia marcescens", J. Environ. Sci. Health, Part B: Pesticides, Food Contaminants, and Agricultural Wastes, 42(3):321-327 (2007).
Marson, et al., "A Novel, Efficient Procedure for Acylation of Cellulose Under Homogeneous Solution Conditions", . Appl. Polymer Sci., 74:1355-1360 (1999).
Mathews, et al., "., Palladium catalyzed Suzuki cross-coupling reactions in ambient temperature ionic liquids", Chem. Commun, (2000), 1249-1250.
Maxim, et al., "Reinforced Magnetic Cellulose Fiber from Ionic Liquid Solution", Nanomater. Energy 1, 225-236 (2012).
Mazurkiewicz, et al., "Conducting Polymer Electrochemistry in Ionic Liquids", Synthetic Metals, 135:31-32 (2003).
Miao,"Electrospinning from Room Temperature Ionic Liquids for Biopolymer Fiber Formation" et al., Green Chem., 12, 1883-1892 (2010).
Min, et al., "Chitin and chitosan nanofibers: electrospinning of chitin and deacetylation of chitin nanofibers", Polymer, 45, 7137-7142 (2004).
Mingos, "Microwaves in Chemical Syntheses", Chem. Indus, 596-599 (1994).
Nara, et al., "Lipase-Catalysed Polyester Synthesis in 1-Butyl-3-Methylimidazolium Hexafluorophosphate Ionic Liquid", Tetrahedron Lett., 44:1371-1373 (2003).
Ngo, et al., "Thermal Properties of Imidazolium Ionic Liquids", Thermochimica Acta, 357-358:97-102 (2000).
No, et al., "Control of Foam Formation by Antifoam during Demineralization of Crustacean Shell in Preparation of Chitin" Food Chem. 46, 1998, 3844.
Ohno, et al., "A New Type of Polymer Gel Electrolyte: Zwitterionic Liquid/Polar Polymer Mixture", Electrochimica Acta, 48:2079-2083 (2003).
Okamato, et al., "Synthesis, Spectra, and Reactions of N-Triphenylmethylpyridinium Salts. Reactions of Triphenylmethyl Chlordie with Pyridine Under High Pressure", J. Org. Chem., 35(11):3752-3756 (1970).
Padhye, M R. et al., "Cellulose Degradation in Xanthate Process", J. App. Polymer Sci. 36:1475-1478 (1988).
Official Methods of Analysis of the Association of Official Analytical Chemists, 13a ed, Horwitz, W. Ed.; AOAC International, Washington, DC, (1980).
Percot, et al., "Optimization of Chitin Extraction from Shrimp Shells", Biomacromolecules, vol. 4, 12-18, (2003).
Perrier, et al., "Reversible Addition—Fragmentation Chain Transfer Polymerization of Methacrylate, Acrylate and Styrene Monomers in 1-Alkyl-3-Methylimidazolium Hexfluorophosphate", European Polymer J., 39(3):417-422 (2003).
Prasad, et al., "Weak gel of chitin with ionic liquid, 1-allyl-3-methylimidazolium bromide", Int. J. Biol. Macromol. vol. 45, 221-225 (2009).
Pu, et al., "Ionic liquid as a green solvent for lignin", J Wood Chem. Technol, 27:23-3 (2007).
Qin, et al., "Dissolution or extraction of crustacean shells using ionic liquids to obtain high molecular weight purified chitin and direct production of chitin films and fibers, Green Chem., 12", Green Chem., 12, 968-971 (2010).
Remsing, et al., "Mechanism of cellulose dissolution in the ionic liquid 1-n-butyl-3-methylimidazolium chloride: a 13C and 35/37CI NMR relaxation study on model systems", Chem. Commun, 1271-1273 (2006).
Ren, et al., "Synthesis of 1-Allyl-3-Methylimidazolium-Based Room Temperature Ionic Liquid and Preliminary Study of its Dissolving Cellulose", Acta Polymerica Sinica, 3448-51 (2003) (abstract).
Rinaudo, et al., "Chitin and chitosan: Properties and application", Polym. Sci., 31:603-632, (2006).

Rødde, et al., "A Seasonal Study of the Chemical Composition and Chitin Quality of Shrimp Shells obtained from Northern Shrimp (*Pandalus borealis*)", Carbohydrate Polymers, 71, 388-393 (2008).
Rogers, et al., "Ionic Liquids—Solvents of the Future?", Science, 302:792-793 (2003).
Rutherford, et al., "Proceedings of the First International Conference on Chitin/Chitosan, ed. Muzzarelli and Pariser", 1978, 182-192.
Sakai, "Determination of Pore Size and Pore Size Distribution", J. Membr. Sci., 96:91-130 (1994).
Scurto, et al., "Carbon dioxide induced separation of ionic liquids and water", Chem. Commun., 572-573 (2003).
Shamshina, et al., "Chitin-Alginate Fibers Spun from Ionic Liquid Solution as Novel Wound Care Composites", J. Mat. Chem B, (2014).
Shigemasa, et al., "Chemical modification of chitin and chitosan 1: preparation of partially deacetylated chitin derivatives via a ring-opening reaction with cyclic acid anhydrides in lithium chloride/N,N-dimethylacetamide", Carbohydr. Polym. 39, 237-243 (1999).
Shriver, et al., "Inorganic Chemistry", W. H. Freeman & Co., New York, pp. 406-407 (1990).
Snedden, et al., "Cross-Linked Polymer-Ionic Liquid Composite Materials", Macromolecules, 36(12):4549-4556 (2003).
Stepnowski, "Solid-phase extraction of room-temperature imidazolium ionic liquids from aqueous environmental samples", Anal. Bioanal. Chem 381,189-193 (2005).
Stollner, et al., "Activation of Cellulose Membranes with 1,1'-Carbonyldiimidazole or 1-Cyano-4-Dimethylaminopyridinium Tetrafluoroborate as a Basis for the Development of Immunosensors", Anal. Biochem., 304:157-165 (2002).
Strauss, et al., "Invited Review. A combinatorial approach to the development of environmentally benign organic chemical preparations", Aust. J. Chem., 52, 823-96 (1999).
Suarez, et al., "Synthesis and Physical-Chemical Properties of Ionic Liquids Based on 1-n-Butyl-3-Methylimidazolium Cation", J. Chim. Phys., 95:1626-1639 (1998).
Sun, et al., "Complete dissolution and partial delignification of wood in the ionic liquid 1-ethyl-3-methylimidazolium acetate", Green Chem 11, 646-655 (2009).
Sun, Ning et al., "Magnetite-Embedded Cellulose Fibers Prepared From Ionic Liquid,", J .Materials Chem., 18:283-290 (2008).
Swatloski, et al., "Dissolution of Cellulose with Ionic Liquids", J. Am. Chem. Soc., 124:4974-4975 (2002).
Swatloski, et al., "Ionic Liquids for the Dissolution and Regeneration of Cellulose", Molten Salts XIII: Proceedings of the International Symposium, Trulove, P.C., DeLong, H.C., Mantz, R.A., Stafford, G.R., Matsunaga, M., Eds., The Electrochemical Society: Pennington, NJ, 19:155-164 (2002).
Synowiecki, et al., "Production, Properties, and Some New Applications of Chitin and Its Derivatives", Crit. Rev. Food Sci. Nutr., 43(2), 145-171 (2003).
Tiller, et al., "A Novel Efficient Enzyme-Immobilization Reaction on NH2 Polymers by Means of L-Ascorbic Acid", Biotechnol. Appl. Biochem., 30:155-162 (1999).
Tokura, et al., "Studies on Chitin. III. Preparation of Chitin Fibers", Polym. J., 11(10), 781-786 (1979).
Turner, "Immobilization of Biocatalysts Using Novel IL-Reconstituted Cellulosic Support Materials", Presentation on Apr. 19, 2005.
Turner, et al., "Ionic Liquid-Reconstituted Cellulose Composites as Solid Support Matrices for Biocatalyst Immobilization", Biomacromolecules 6, 2497-2502 (2005).
Turner, et al., "Production of Bioactive Cellulose Films Reconstituted from Ionic Liquids", Biomacromolecules, 5:1379-1384 (2004).
Vijayaraghavan, et al., "An Assessment on the Interaction of a Hydrophilic Ionic Liquid with Different Sorbents", Ind. Eng. Chem. Res., 48, 7283-7288 (2009).
Visser, Ann E. et al., "Task Specific Ionic Liquids for the Extraction of Metal Ions from Aqueous Solutions,", Chem. Commun., 135-136 (2001).
Wasserscheid, et al.,"Ionic Liquids—New "Solutions" for Transition Metal Catalysis", Angew Chem Int Ed Engl. 39, (2000).

(56) References Cited

OTHER PUBLICATIONS

Weckstrom, et al., "Entrapment of Whole Cell Yeast β-Galactosidase in Precipated Cellulose Derivatives", Food Process Eng., vol. 2, Applied Science Publishers Ltd., pp. 148-151 (1979).
Welton, "Room-Temperature Ionic Liquids. Solvents for Synthesis and Catalysis", Chem Rev., 99:2071-2083 (1999).
Wilkes, et al., "Air and Water Stable 1-Ethyl-3-methylimidazolium Based Ionic Liquids", J. Chem. Soc. Chem. Commun.,965-967 (1992).
Willauer, et al., "Investigation of aqueous biphasic systems for the separation of lignins from cellulose in paper pulping process", J. Chromatogr. B: Biomed. Sci. Applic., 743(1-2):127-135 (2000).
Wu, et al., "A novel biomass-ionic liquid platform for the utilization of native chitin", Polymer 49, 2321-2327 (2008).
Wu, et al., "Do we understand the recyclability of ionic liquids?", Chem. Eur. J. 15, 1804-1810 (2009).
Wu, et al., "Homogeneous Acetylation of Cellulose in a New Ionic Liquid", Biomacromol., 5:266-268 (2004).
XIE et al., "Chitin and chitosan dissolved in ionic liquids as reversible sorbents of $CO_2$", Green Chem. 8, 630-633 (2006).
Yamazaki, et al., "An acidic cellulose-chitin hybrid gel as novel electrolyte for an electric double layer capacitor", Electrochem. Commun. vol. 11, 68-70 (2009).
Yusof, et al., "Flexible chitin films as potential wound-dressing materials: Wound model studies", J. Biomed. Mater. Res. A 66:224, (2003).
Anderson et al., Structure and Properties of High Stability Geminal Dicationic Ionic Liquids, J. Amer. Chem. Soc., 127(2):593-604 (2005).
Chen et al., Enhanced mechanical properties of novel chitosan nanocomposite fibers, Carbohydrate Polymers, 2011, 86(3), 1151-1156.
Coghlan. Mouldy dressings help wounds heal, New Scientist, 1995, 145(1970), 21.
Dubbs et al. Solubility of vitamin E (alpha-tocopherol) and vitamin K3 (menadione) in ethanol-water mixture, Journal of Chemical & Engineering Data, 1998, 43(4), 590-591.
Dutta et al., Chitin and chitosan: Chemistry, properties and applications, Journal of Scientific & Industrial Research, 2004, 63, 20-31.
Fan et al., Preparation and Properties of Alginate/Water-Soluble Chitin Blend Fibers, Journal of Macromolecular Science, Part A: Pure and Applied Chemistry, 2005, 42(6), 723-732.
Khor et al., Implantable applications of chitin and chitosan, Biomaterials, 2003, 24(13), 2339-2349.
Lee et al., Advances in chitosan material and its hybrid derivatives: A review, The Open Biomaterials Journal, 2009, 1, 10-20.
Lim et al., Biomedical-grade chitosan in wound management and its biocompatibility in vitro, Biopolymers, Chapter 2, 2010, 19-36.
Loupy et al., New solvent-free organic synthesis using focused microwave, Synthesis, pp. 1213-1234 (1998).
Mori et al. Effect of chitin and its derivatives on the proliferation and cytokine production of fibroblasts in vitro, Biomaterials, 1997, 18(13), 947-951.
Park et al., Applications of Chitin and its Derivatives in Biological Medicine, International Journal of Molecular Sciences, 2010, 11, 5152-5164.
Piyakulawat et al., Preparation and Evaluation of Chitosan/Carrageenan Beads for Controlled Release of Sodium Diclofenac, AAPS PharmSciTech, 2007, 8(4), 20-130.
Prasad et al., Hydrogen Storage in Double Clathrates with tert-Butylamine, The Journal of Physical Chemistry A, Letters, 2009, 113(24), 6540-6543.
Rathinamoorthy et al., Polysaccharide Fibers in Wound Management, International Journal of Pharmacy and Pharmaceutical Sciences, 201, 3(3), 38-44.
Rodrigues et al., Biocompatibility of Chitosan Carriers with Application in Drug Delivery, Journal of Functional Biomaterials, 2012, 3, 615-641.
Sashiwa et al., Chemical modification of chitin and chitosan 2: preparation and water soluble property of N-acylated or N-alkylated partially deacetylated chitins, Carbohydrate Polymers, 1999, 39, 127-138.
Sukhanova et al. , Vysokomol. Soedin. Ser. B 31 (1989) 381; Chem. Abstr. 111(20):175985n.
Tiller et al., A Novel Efficient Enzyme-Immobilization Reaction on NH2 Polymers by Means of L-Ascorbic Acid, Biotechnol. Appl. Biochem., 30:155-162 (1999).
Turner et al., Production of Bioactive Cellulose Films Reconstituted from Ionic Liquids, Biomacromolecules, 6:1379-1384 (2004).
Tuzlakoglu et al., Production and Characterization of Chitosan Fibers and 3-D Fiber Mesh Scaffolds for Tissue Engineering Applications, Micromolecular Bioscience, 2004, 4, 811-819.
Wang et al., Chitosan-Alginate PEC Membrane as a Wound Dressing: Assessment of Incisional Wound Healing, Journal of Biomedical Materials Research, 2002, 63(5), 601-618.
Zaman et al., Physico-medical properties of wound dressing material and its biomedical application, Journal of the Mechanical Behavior of Biomedical Materials, 2011, 4(7), 1369-1375.
Zhang et al., Preparation and Properties of Bacterial Cellulose/Alginate Blend Bio-Fibers, Journal of Engineered Fibers and Fabrics, 2011, 6(3), 69-72.
Zhang et al., Preparation of Cellulose/Chitin Blend Bio-Fibers via Direct Dissolution, Cellulose Chemistry and Technology, 2009, 43, 393-398.

* cited by examiner

CHEMICAL PULPING OF CHITINOUS BIOMASS FOR CHITIN

CROSS-REFERENCE TO RELATED APPLICATIONS

This application claims benefit of priority to U.S. Provisional Application No. 62/042,392, filed Aug. 27, 2014, which is hereby incorporated herein by reference in its entirety.

FIELD

The subject matter disclosed herein generally relates to compositions and to methods of separating chitin from a chitinous biomass.

BACKGROUND

Chitin is a naturally occurring linear polymer of N-acetylglucosamine, which is a derivative of glucose. Additionally, chitin, which can be found as the structural support in the outer skeleton of arthropods and in the cell wall of fungi, is the second-most abundant naturally occurring polymer in the world (Bartlett et al., *Science*, 310:1775-1777, 2005). Chitin's high bioactivity, biocompatibility, strength, and low toxicity (Jayakumar et al., *Garb. Polym.*, 82:227-232, 2010), make it suitable for a variety of both low value applications, such as water treatment, agriculture and food additives, and high value applications, such as cosmetics, medical bandages, and drug delivery.

However, obtaining pure chitin has remained elusive due to its insolubility in water, most organic solvents, dilute acidic solutions, and dilute basic solutions. Various modifications have been utilized to make chitin more water soluble, including partial N-deacetylation, through the removal of the acetyl functional group, to form chitosan (Rinaudo, *Polym. Sci.*, 31:603-632, 2006). The material properties can change as a function of the degree of acetylation (DA), which is a measure of the ratio of acetyl groups to amine groups (FIG. 1).

The current industrial pulping process for chitin from crustacean shell involves two basic steps: (i) deproteinization, removal of proteins and lipids, by alkaline treatment (NaOH, 1 M, 1-72 h, 65-100° C.) and (ii) demineralization, separation of calcium carbonate/calcium phosphate, by acidic treatment (HCl, 0.275-2 M, 1-48 h, RT-100° C.) (Percot et al., *Biomacromolecules*, 4:12-18, 2003) and Mahmoud et al., *Biochem. Biotechnol.*, 3:1-9, 2007). Such extreme conditions can result in hydrolysis/degradation of the chitin, allowing for little control over the final product's physical characteristics, such as crystallinity, purity, and polymer chain arrangement.

Strong acid treatment can affect the polymer backbone of the chitin molecule, as it can cleave the β-1,4-glycosidic bonds in chitin, which can result in a lower molecular weight and, upon dissolution, a lower viscosity. The strong acids used for the demineralization of chitin can also affect the degree of acetylation (Cauchie, In Advances in Chitin Science, A. Domard, G. A. F. Roberts, K. M. Varum (Eds.), 1997, pp. 32-38), which can severely limit the potential applications of the chitin. Various chemical modifications of the above-mentioned industrial protocol have been applied to disrupt the inter- and intramolecular hydrogen bonds of the chitin without cleavage of its glycosidic linkages (Sashiwa and Shigemasa. *Carbohydr. Polym.*, 39:127, 1999). This process of chitin purification is not only energy-intensive, but damaging to the environment because of the disposal of high volumes of mineral acids and bases. This high volume of corrosive waste streams results in increased costs and regulatory scrutiny.

Thus, not only do current methods of isolating chitin by chemical pulping lead to partial deacetylation and decrease of molecular weight, but they are costly and energy intensive. As a result, there is a need for a cheaper and more effective process for pulping chitinous biomass for pure, high quality chitin material with a high percentage of acetylation and high molecular weight. The methods and compositions disclosed herein address these and other needs.

SUMMARY

The subject matter disclosed herein generally relates to compositions and to methods of isolating chitin from chitinous biomass, which contains chitin and non-chitin material. In particular examples, disclosed herein are methods for separating chitin from chitinous biomass. In some examples, chitin can be chemically pulped from a chitinous biomass using a protic ionic liquid to separate chitin with a high molecular weight and high degree of acetylation. In some further examples, chitin can be chemically pulped from a chitinous biomass using a "one pot" process by consecutive addition of an acid followed by a base (or consecutive addition of a base followed by addition of an acid) forming the ionic liquid in situ, to separate chitin with a high molecular weight and high degree of acetylation. In some examples, an organic solvent or aqueous solvent can be added to the mixture to separate chitin from the remaining protic ionic liquid and biomass mixture.

Additional advantages of the disclosed process will be set forth in part in the description which follows, and in part will be obvious from the description, or can be learned by practice of the disclosed process. The advantages of the disclosed process will be realized and attained by means of the elements and combinations particularly pointed out in the appended claims. It is to be understood that both the foregoing general description and the following detailed description are exemplary and explanatory only and are not restrictive of the disclosed process, as claimed.

BRIEF DESCRIPTION OF THE FIGURES

The accompanying figures, which are incorporated in and constitute a part of this specification, illustrate several aspects described below.

[CH₃COO], chitin pulped with CH₃COOH followed by NH₂OH, and chitin pulped with NH₂OH followed by CH₃COOH.

Figure 1:
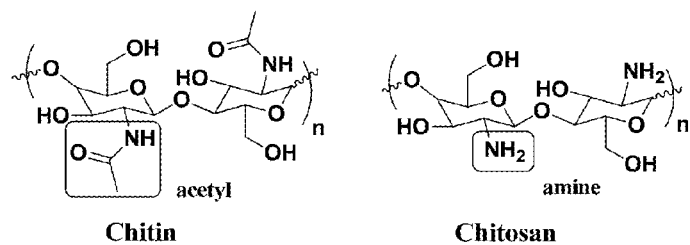
FIG. 1 demonstrates the chemical structures of chitin (left) and chitosan (right).
Figure 2:
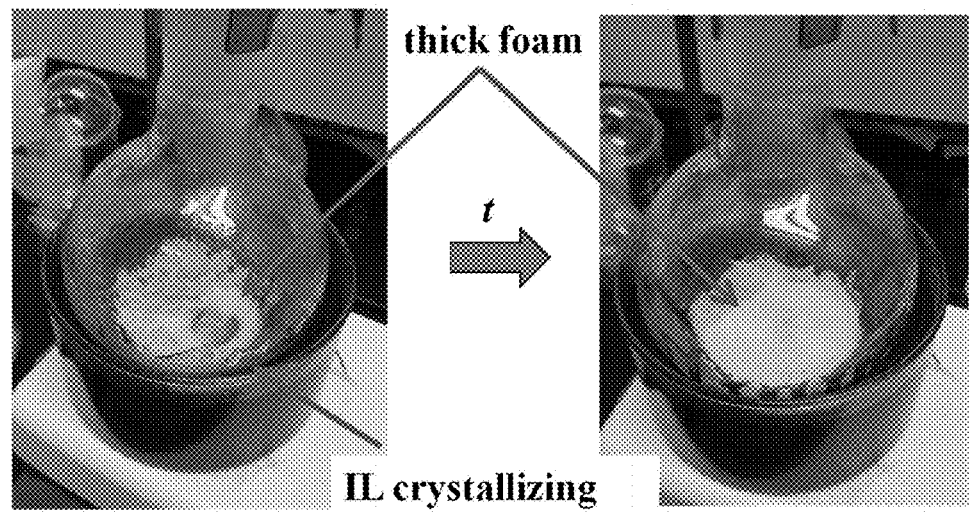
FIG. 2 is a pair of photographs showing the pulping process of ground shrimp shells for chitin with [$NH_3OH$][$CH_3COO$]. The left photograph shows the initial contact between the solid, protic ionic liquid and the chitinous biomass, which generates $CO_2$. The right photograph displays the solid ionic liquid melting into a liquid upon heating, which separates chitin from the chitinous biomass and further generates $CO_2$.
Figure 3:
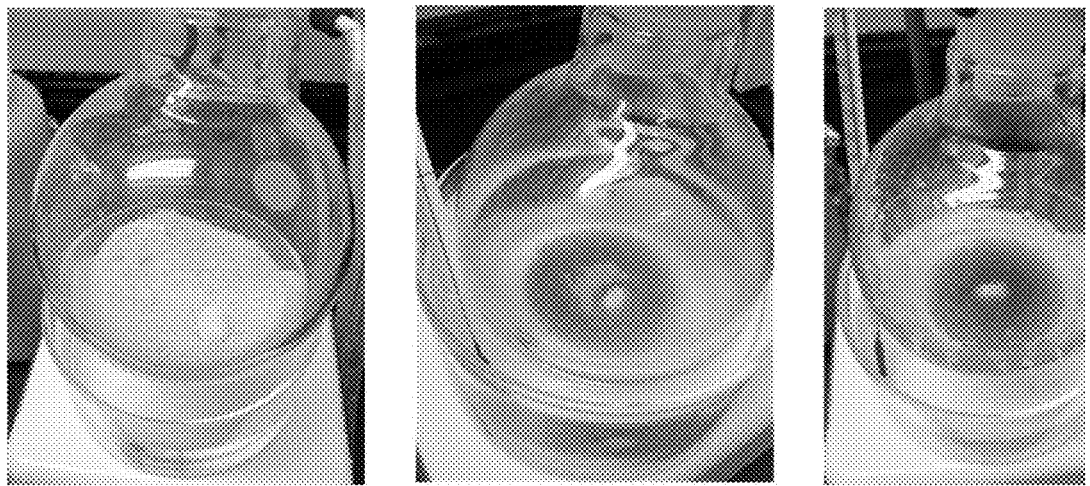
FIG. 3 is a group of photographs showing the chemical pulping process using [$NH_3(CH_2)_2OH$][$CH_3COO$].
Figure 4:
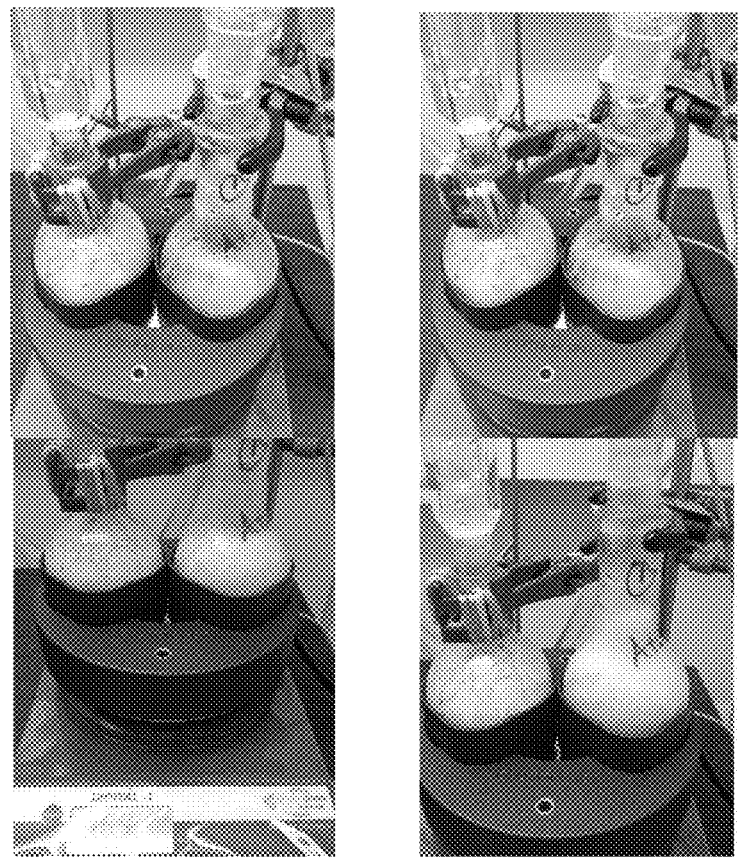
FIG. 4 is a group of photographs showing the chemical pulping process using consecutive $CH_3COOH+NH_2OH$ (A+B or acid+base) or $NH_2OH+CH_3COOH$ (B+A, base+acid).
Figure 5:
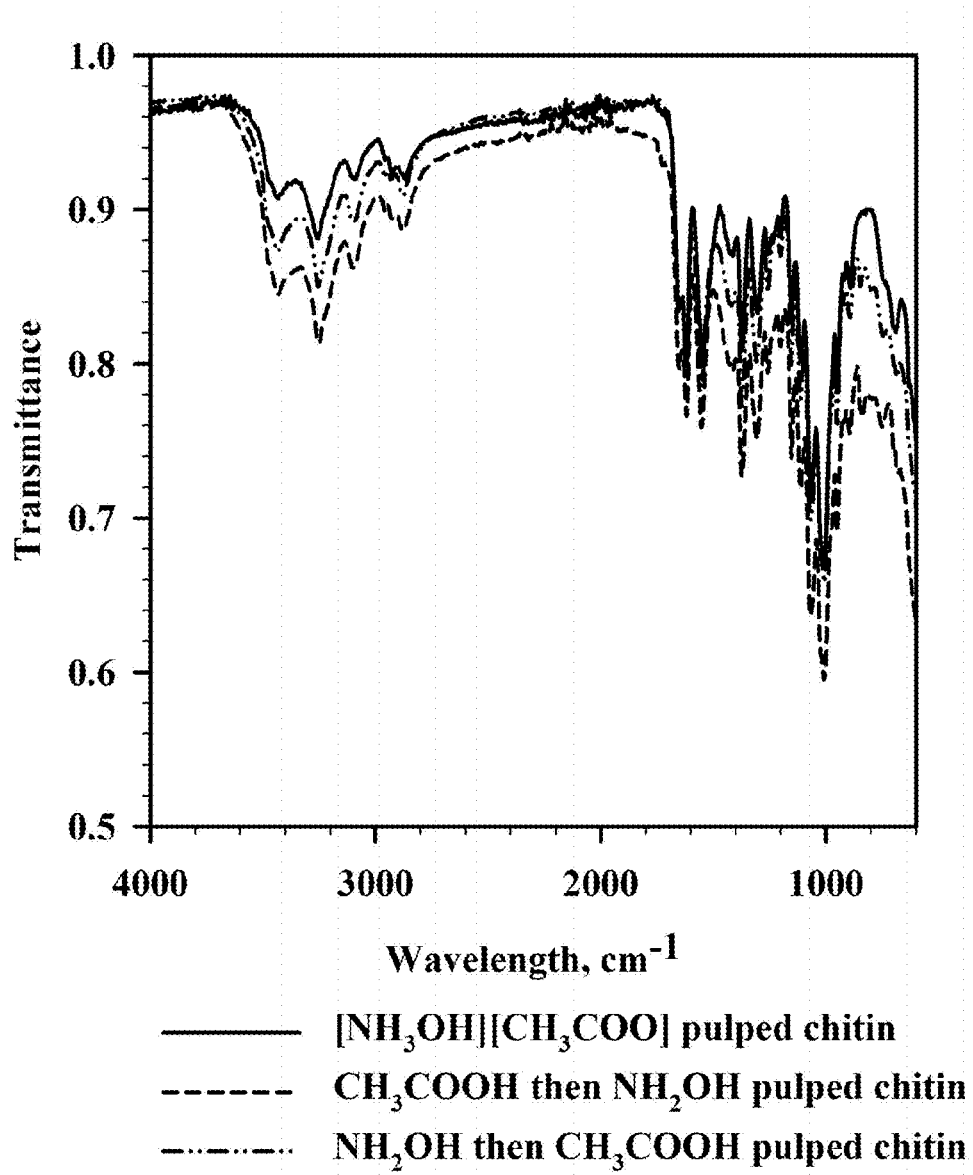
FIG. 5 is a graph that displays the Fourier-Transform infrared (FT-IR) analysis of chitin pulped with [$NH_3OH$]
Figure 6:
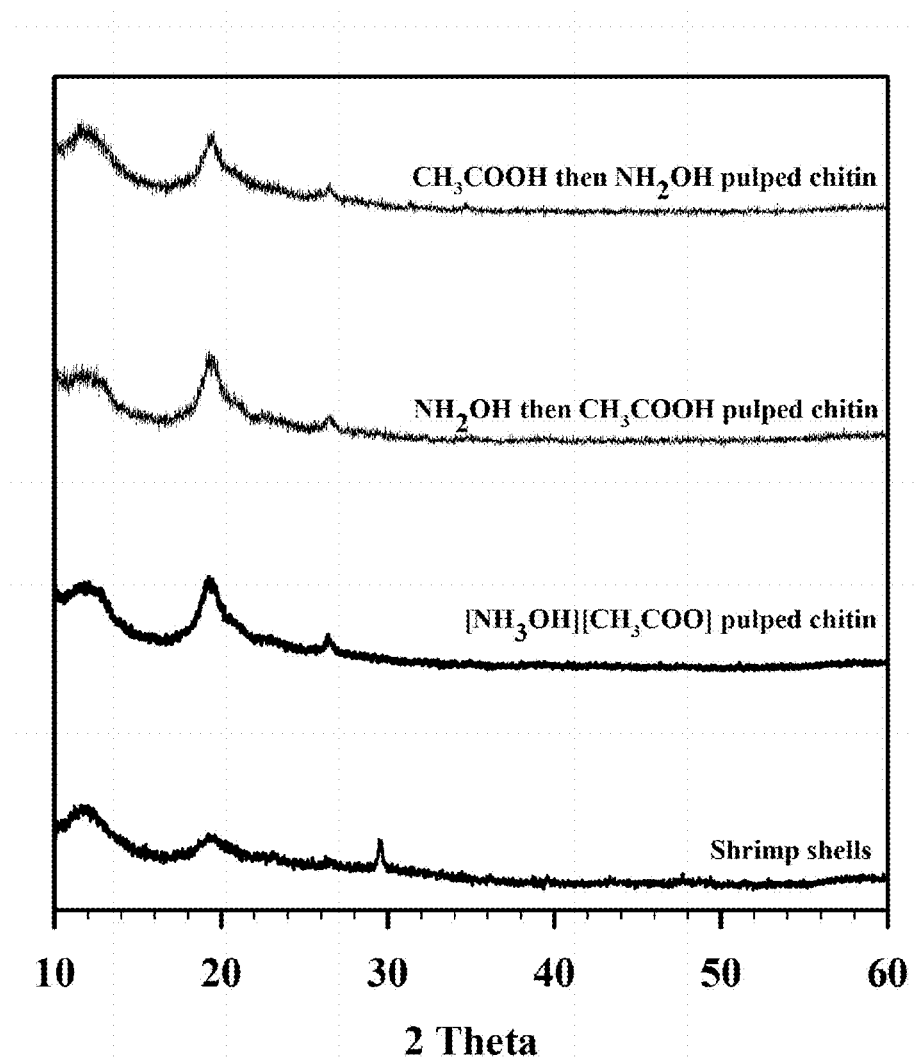

FIG. 6 is a graph that displays the powder X-ray diffraction (PXRD) analyses of samples obtained through pulping shrimp shells with [NH₃OH][CH₃COO], and comparison with consecutive CH₃COOH+NH₂OH (A+B or acid+base) or NH₂OH+CH₃COOH (B+A, base+acid).

Figure 7:
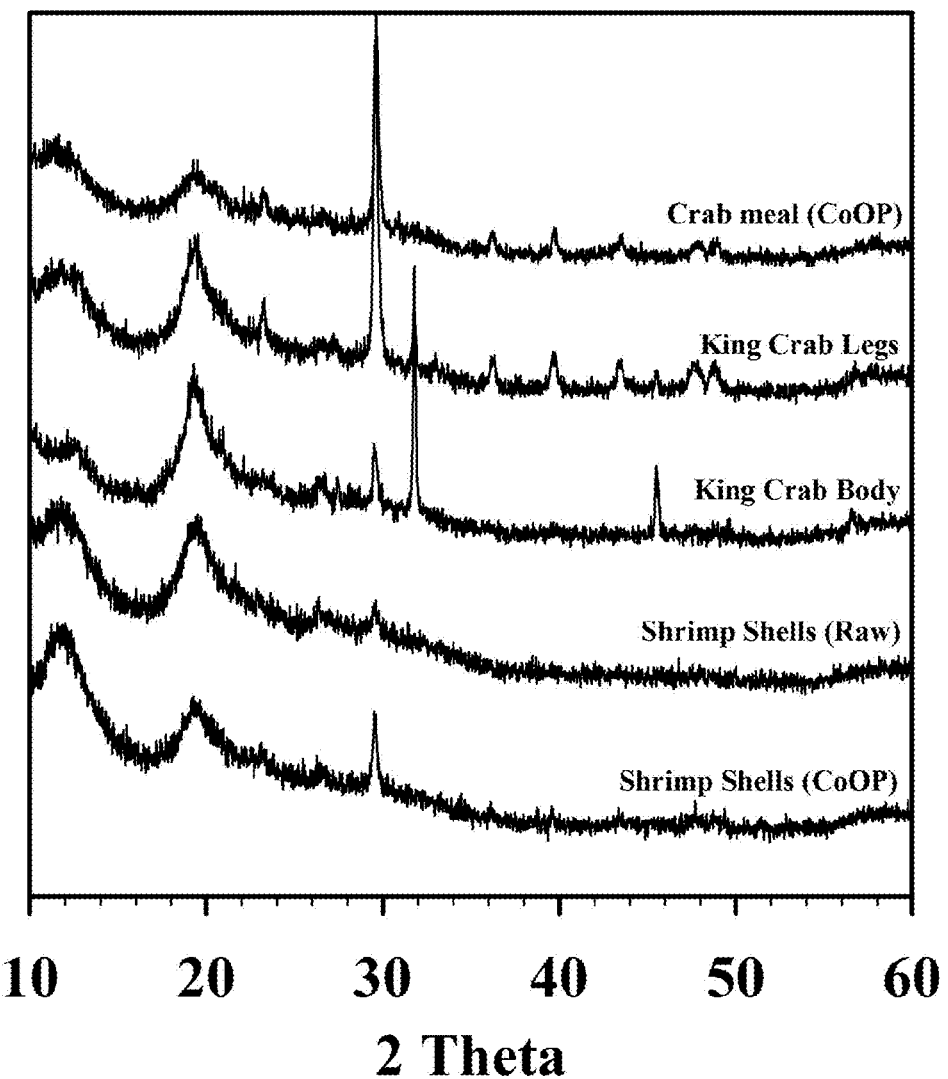

FIG. 7 is a graph that displays the PXRD of samples obtained through pulping other chitin sources with [NH₃OH][CH₃COO].

Figure 8:
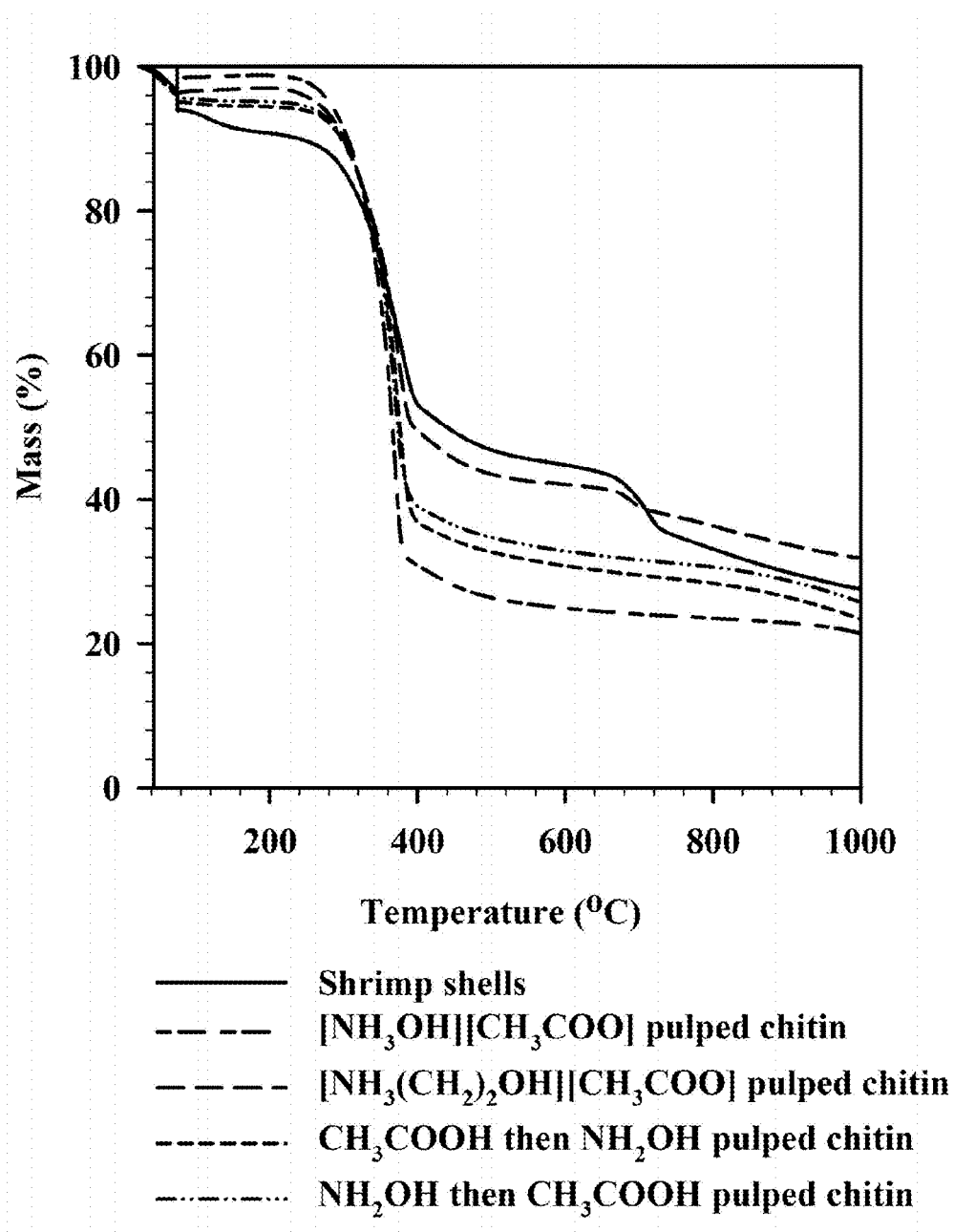

FIG. 8 is a graph that displays the thermogravimetric analysis of shrimp shells, chitin pulped with [NH₃OH][CH₃COO], chitin pulped with [NH₃(CH₂)₂OH][CH₃COO], chitin pulped with CH₃COOH followed by NH₂OH, chitin pulped with NH₂OH followed by CH₃COOH.

Figure 9:
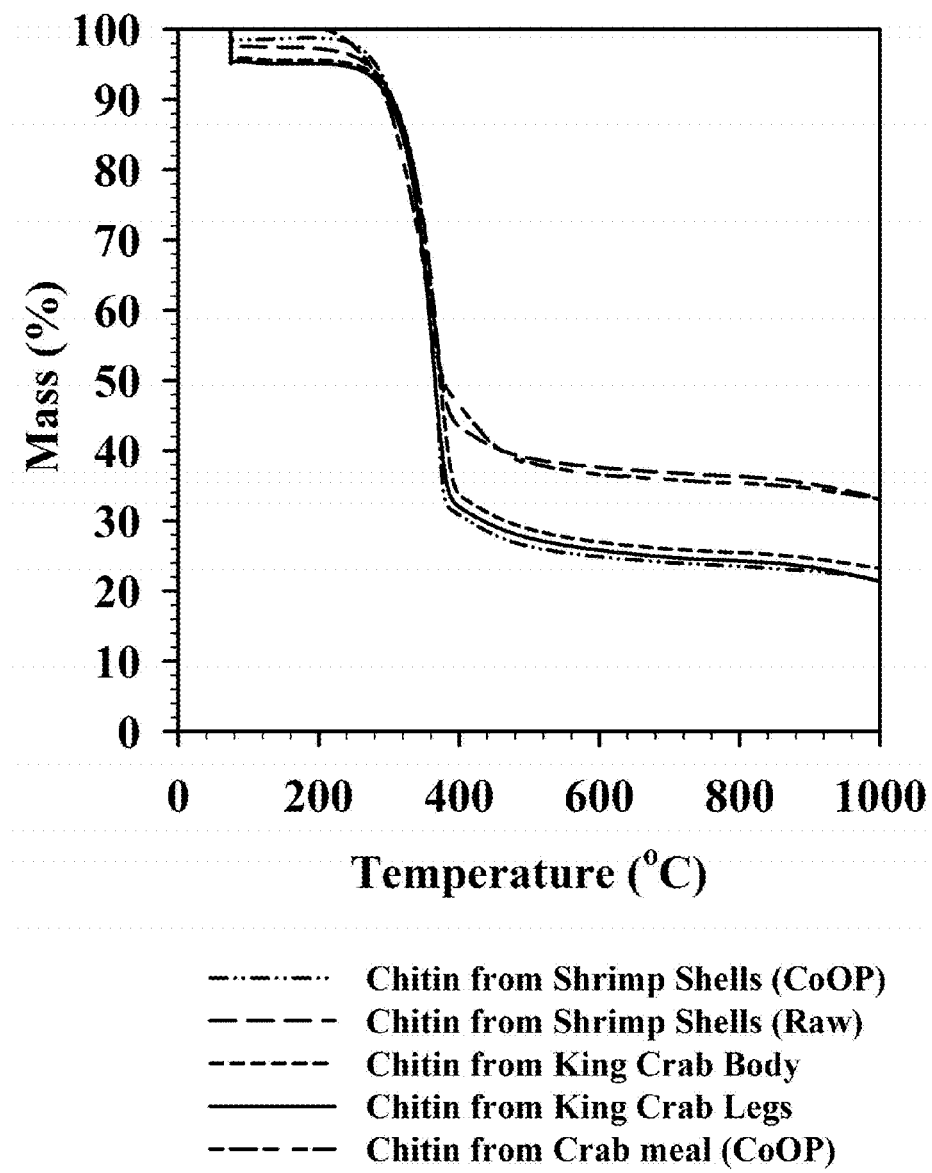

FIG. 9 is a graph that displays the thermogravimetric analysis (TGA) of material pulped using [NH₃OH][CH₃COO] from processed shrimp shells (SS, CoOP), raw shrimp shells, crab meal, and king crab body and legs.

Figure 10:
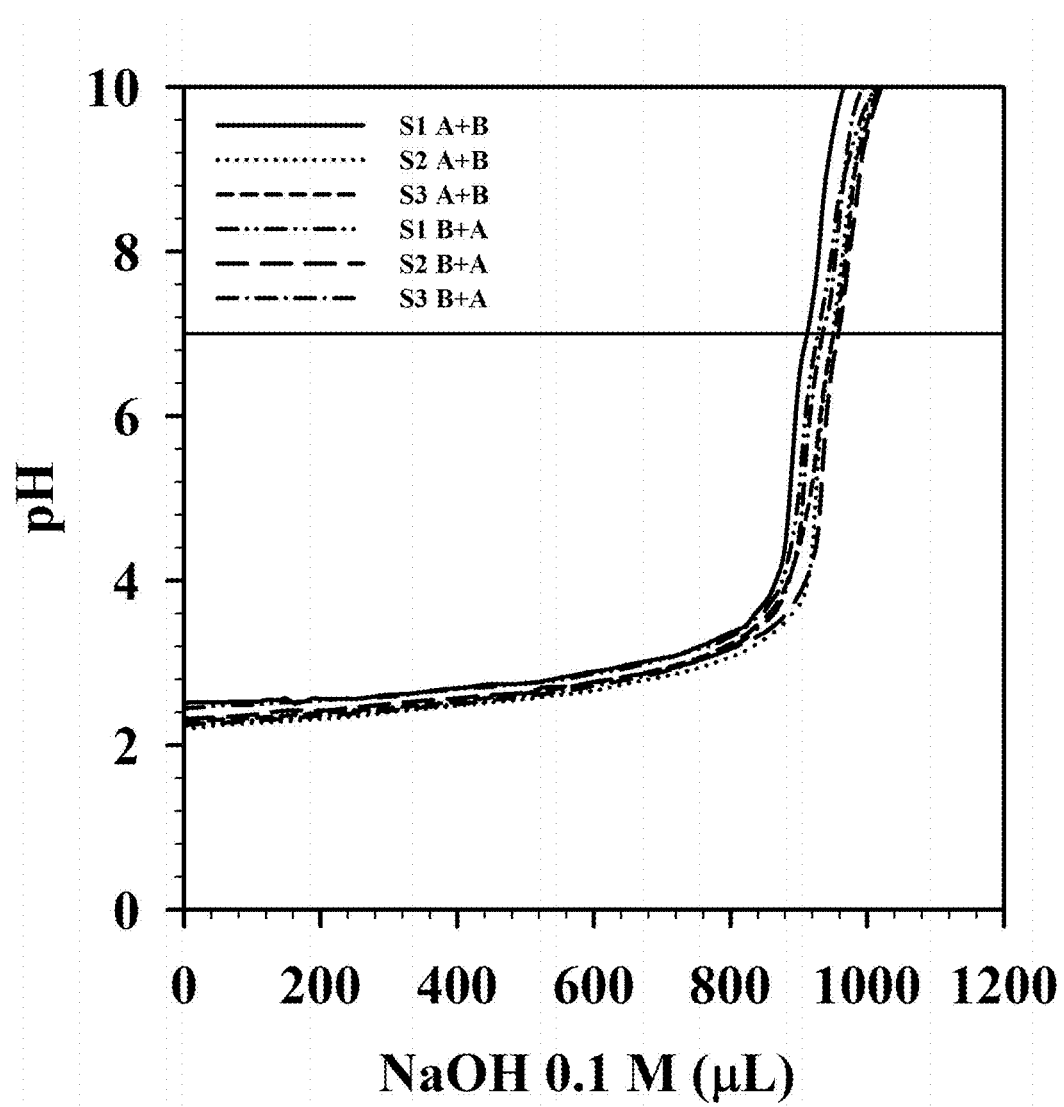

FIG. 10 is a graph that displays an example of titration curves for the titration of excess of 0.1 M HCl with 10-25 µL aliquots of 0.1 M NaOH. S1-S3 samples obtained through treatment of CH₃COOH then NH₂OH (A+B or acid+base), S4-S6 samples obtained through treatment with NH₂OH then CH₃COOH (B+A, base+acid). Note: No additional deproteinization/demineralization was conducted on these samples.

DETAILED DESCRIPTION

The materials, compounds, compositions, articles, and methods described herein can be understood more readily by reference to the following detailed description of specific aspects of the disclosed subject matter and the Examples and Figures included therein.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an ionic liquid" includes mixtures of two or more such ionic liquids, reference to "the compound" includes mixtures of two or more such compounds, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

CHEMICAL DEFINITIONS

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

The term "ion," as used herein, refers to any molecule, portion of a molecule, cluster of molecules, molecular complex, moiety, or atom that contains a charge (positive, negative, or both at the same time within one molecule, cluster of molecules, molecular complex, or moiety (e.g., Zwitterions)) or that can be made to contain a charge. Methods for producing a charge in a molecule, portion of a molecule, cluster of molecules, molecular complex, moiety, or atom are disclosed herein and can be accomplished by methods known in the art, e.g., protonation, deprotonation, oxidation, reduction, alkylation acetylation, esterification, deesterification, hydrolysis, etc.

The term "anion" is a type of ion and is included within the meaning of the term "ion." An "anion" is any molecule, portion of a molecule (e.g., Zwitterion), cluster of molecules, molecular complex, moiety, or atom that contains a net negative charge or that can be made to contain a net negative charge. The term "anion precursor" is used herein to specifically refer to a molecule that can be converted to an anion via a chemical reaction (e.g., deprotonation).

The term "cation" is a type of ion and is included within the meaning of the term "ion." A "cation" is any molecule, portion of a molecule (e.g., Zwitterion), cluster of molecules, molecular complex, moiety, or atom, that contains a net positive charge or that can be made to contain a net positive charge. The term "cation precursor" is used herein to specifically refer to a molecule that can be converted to a cation via a chemical reaction (e.g., protonation or alkylation).

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent (s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkyl alcohol" is used in another, it is not meant to imply that the term "alkyl" does not also refer to specific terms such as "alkyl alcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkoxy" as used herein is an alkyl group bound through a single, terminal ether linkage; that is, an "alkoxy" group can be defined as —$OA^1$ where $A^1$ is alkyl as defined above.

The term "alkenyl" as used herein is a hydrocarbon group of from 2 to 24 carbon atoms with a structural formula containing at least one carbon-carbon double bond. Asymmetric structures such as ($A^1A^2$)C=C($A^3A^4$) are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "aldehyde" as used herein is represented by the formula —C(O)H. Throughout this specification "C(O)" is a short hand notation for C=O.

The terms "amine" or "amino" as used herein are represented by the formula $NA^1A^2A^3$, where $A^1$, $A^2$, and $A^3$ can be, independently, hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH. A "carboxylate" as used herein is represented by the formula —C(O)O⁻.

The term "ester" as used herein is represented by the formula —OC(O)$A^1$ or —C(O)O$A^1$, where $A^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $A^1OA^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $A^1C(O)A^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" as used herein refers to the halogens fluorine, chlorine, bromine, and iodine.

The term "hydroxyl" as used herein is represented by the formula —OH.

The term "nitro" as used herein is represented by the formula —$NO_2$.

The term "silyl" as used herein is represented by the formula —Si$A^1A^2A^3$, where $A^1$, $A^2$, and $A^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

"$R^1$," "$R^2$," "$R^3$," "Re," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

As used herein, substantially pure means sufficiently homogeneous to appear free of readily detectable impurities as determined by standard methods of analysis, such as thin layer chromatography (TLC), nuclear magnetic resonance (NMR), gel electrophoresis, high performance liquid chromatography (HPLC) and mass spectrometry (MS), gas-chromatography mass spectrometry (GC-MS), and similar, used by those of skill in the art to assess such purity, or sufficiently pure such that further purification would not detectably alter the physical and chemical properties, such as enzymatic and biological activities, of the substance. Both traditional and modern methods for purification of the compounds to produce substantially chemically pure compounds are known to those of skill in the art. A substantially chemically pure compound can, however, be a mixture of stereoisomers. Unless stated to the contrary, a formula with chemical bonds shown only as solid lines and not as wedges or dashed lines contemplates each possible isomer, e.g., each enantiomer, diastereomer, and meso compound, and a mixture of isomers, such as a racemic or scalemic mixture.

The term "hydrogen bond" describes an attractive interaction between a hydrogen atom from a molecule or molecular fragment X—H in which X is more electronegative than H, and an atom or a group of atoms in the same or different molecule, in which there is evidence of bond formation. The hydrogen bond donor can be a cation and the hydrogen bond acceptor can be an anion.

The term "co-crystal" describes a crystalline structure made up of two or more atoms, ions, or molecules that exist in a definite stoichiometric ratio. Generally, a co-crystal is comprised of two or more components that are not covalently bonded and instead are bonded via van-der-Waals interactions, ionic interactions or via hydrogen bonding.

The term "complex" describes a coordination complex, which is a structure comprised of a central atom or molecule that is weakly connected to one or more surrounding atoms or molecules, or describes chelate complex, which is a coordination complex with more than one bond.

The term "eutectic" is a mixture of two or more ionic liquids, ionic liquids and neutral compounds, ionic liquids and charge compounds, ionic liquids and complexes, ionic liquids and ion pairs, or two or more ion pairs that have at least one component in common.

References to "mim," "$C_n$-mim," and "bmim" are intended to refer to a methyl imidazolium compound, an alkyl (with n carbon atoms) methyl imidazolium compound, and a butyl methylimidazolium compound respectively.

The term "protic ionic liquid" describes an ionic liquid formed by the potentially reversible protonation of a base with a Brønsted acid to form a salt.

A "Brønsted acid" is an acidic compound capable of donating a proton to an appropriate base, which will form an anionic species with respect to the original acid.

As used herein, the term "chitinous biomass" means any source of chitin or chitosan that is derived from an arthropod (e.g., the exoskeleton of an arthropod, such as the exoskeleton on an insect or a marine exoskeleton, such as the shells of crustaceans like shrimp, crab, lobster, crawfish, prawns, etc.) or fungi.

As used herein, the term "chitosan" means deacetylated chitin (at least 50% deacetylated) or any other form of chemically modified chitin.

Reference will now be made in detail to specific aspects of the disclosed materials, compounds, compositions, formulations, articles, and methods, examples of which are illustrated in the accompanying Examples and Figures.

Methods

Disclosed herein are methods for separating chitin from a chitinous biomass using a pulping liquid. The chitinous biomass can, in some examples, comprise an arthropod biomass, a fungi biomass, or a combination thereof. An arthropod biomass can, for example, comprise the exoskeleton of an arthropod. Examples of arthropods include, but are not limited to, shrimp, crabs, lobsters, insects, and any combination thereof. In some examples, the chitinous biomass can contain chitin and non-chitin material.

Chitin derived from crustaceans is available from suppliers as "pure chitin" and as "practical grade chitin." These forms of chitin undergo a process similar to the Kraft Process for obtaining cellulose from wood or other sources of cellulose. During the process of preparing pure chitin and practical grade chitin, there is a breakdown of the polysaccharide chains such that the resulting chitin has a shorter chain length and therefore a lower average molecular weight than it had before it was processed. The disclosed processes provide a method of directly pulping chitin from a chitinous biomass without substantially shortening the polysaccharide chains. Additionally, a higher yield can be obtained in comparison to the previously disclosed extraction methods with an ionic liquid or to traditional acid derived processes. Moreover the disclosed chitin can be substantially free of agents that are typically found in pure and practical grade chitin, such as methanesulfonic acid, trichloroacetic acid, dichloroacetic acid, formic acid, and dimethylacetamide.

The pulping liquid is a liquid that preferentially solubilizes the non-chitin material that is present in the chitinous biomass and, conversely, does not preferentially dissolve the chitin. As such, in some examples of the disclosed processes, chitin is pulped or separated from a chitinous biomass that contains chitin and non-chitin material. The methods can, for example, comprise contacting the chitinous biomass with the pulping liquid to form a mixture; wherein a majority of the non-chitin material from the chitinous biomass is dissolved in or removed by the pulping liquid and a majority of the chitin from the chitinous biomass is not dissolved in the pulping liquid to form a residue. As such, the chitin material forms a residue and is thus separated from the non-chitin material.

The use of a pulping liquid in the pulping of crustacean shells can provide a readily source of pure chitin of higher quality than the industrial practical grade chitin, using a cheaper and more environmental friendly process. To differentiate the two processes, the ionic liquid process using $[C_2mim][CH_3COO]$ (Qin et al., *Green Chem.*, 12:968, 2010 and WO 2010141470 extracts the chitin by solubilizing the chitin and a few minor impurities, while the processes disclosed herein (i.e., using a pulping liquid such as a protic ionic liquid or one-pot process that uses acid-base combination) dissolves and extracts the impurities (e.g., proteins, $CaCO_3$) while leaving the insoluble chitin behind as a residue.

The pulping liquid used herein can be a composition that comprises a cation and anion that form an ion pair, ionic liquid, are hydrogen bonded, form a complex, eutectic, or form a cocrystal. In specific examples, the pulping liquid disclosed herein can be a protic ionic liquid.

Also disclosed herein are methods for separating chitin from a chitinous biomass comprising contacting the chitinous biomass with a protic ionic liquid to form a mixture. The mixture can, in some examples, comprise about 20 wt. % or less of the chitinous biomass. In other words, the chitinous biomass can be present in the protic ionic liquid at about 20 wt. % or less (e.g., about 15, 10, 5, or 1 wt. %). Also, in other examples, the chitinous biomass to chitin can be present in the protic ionic liquid at about 5 wt. % or more (e.g., about 10, 15, or 20 wt. %). In still other examples, the chitinous biomass can be present in the protic ionic liquid at from about 5 to about 30 wt. %, from about 5 to about 15 wt. %, from about 10 to about 30 wt. %, from about 10 to about 20 wt. %, or from about 15 to about 25 wt. %. In some examples, a majority of the non-chitin material from the chitinous biomass is removed from the chitinous biomass by the ionic liquid. In some examples, a majority of the chitin form the chitinous biomass is not dissolved in the ionic liquid and forms a residue.

The term "ionic liquid" has many definitions in the art, but is used herein to refer to salts (i.e., an ionic compound of cations and anions) that are liquid at a temperature of at or below about 150° C. That is, at one or more temperature ranges or points at or below about 150° C. the disclosed ionic liquid compositions are liquid; although, it is understood that they can be solids at other temperature ranges or points. See e.g., Wasserscheid and Keim, *Angew Chem Int Ed Engl*, 2000, 39:3772; and Wasserscheid, "Ionic Liquids in Synthesis," 1st Ed., Wiley-VCH, 2002.

The disclosed pulping liquids are liquid at some temperature range or point at or below about 150° C. For example, the disclosed protic ionic liquids can be a liquid at or below about 150, 149, 148, 147, 146, 145, 144, 143, 142, 141, 140, 139, 138, 137, 136, 135, 134, 133, 132, 131, 130, 129, 128, 127, 126, 125, 124, 123, 122, 121, 120, 119, 118, 117, 116, 115, 114, 113, 112, 111, 110, 109, 108, 107, 106, 105, 104, 103, 102, 101, 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0, −1, −2, −3, −4, −5, −6, −7, −8, −9, −10, −11, −12, −13, −14, −15, −16, −17, −18, −19, −20, −21, −22, −23, −24, −25, −26, −27, −28, −29, −30, −31, −32, −33, −34, −35, −36, −37, −38, −39, −40, −41, −42, −43, −44, −45, −46, −47, −48, −49, −50, −51, −52, −53, −54, −55, −56, −57, −58, −59, −60, −61, −62, −63, −64, −65, −66, −67, −68, −69, −70, −71, −72, −73, −74, −75, −76, −77, −78, −79, −80, −81, −82, −83, −84, −85, −86, −87, −88, −89, −90, −91, −92, −93, −94, −95, −96, −97, −98, −99, or −100° C., where any of the stated values can form an upper or lower endpoint.

Further, in some examples the disclosed protic ionic liquids can be liquid over a wide range of temperatures, not just a narrow range of, for example, 1-2 degrees. For example, the disclosed protic ionic liquids can be liquids over a range of at least about 4, 5, 6, 7, 8, 9, 10, or more degrees. In other examples, the disclosed protic ionic liquids can be liquid over at least about an 11, 12, 13, 14, 15, 16, 17, 18, 19, 20, or more degree temperature range. Such temperature ranges can begin and/or end at any of the temperature points disclosed in the preceding paragraph.

In further examples, the disclosed protic ionic liquids can be liquid at any point from about −30° C. to about 150° C., from about −20° C. to about 140° C., −10° C. to about 130° C., from about 0° C. to about 120° C., from about 10° C. to about 110° C., from about 20° C. to about 100° C., from about 30° C. to about 90° C., from about 40° C. to about 80° C., from about 50° C. to about 70° C., from about −30° C. to about 50° C., from about −30° C. to about 90° C., from about −30° C. to about 110° C., from about −30° C. to about 130° C., from about −30° C. to about 150° C., from about 30° C. to about 90° C., from about 30° C. to about 110° C., from about 30° C. to about 130° C., from about 30° C. to about 150° C., from about 0° C. to about 100° C., from about 0° C. to about 70° C., from about 0° to about 50° C., and the like.

Further, exemplary properties of ionic liquids are high ionic range, non-volatility, non-flammability, high thermal stability, wide temperature for liquid phase, highly solvability, and non-coordinating. For a review of ionic liquids see, for example, Welton, *Chem Rev.*, 99:2071-2083, 1999; and Carlin et al., Advances in Nonaqueous Chemistry, Mamantov et al. Eds., VCH Publishing, New York, 1994. These references are incorporated by reference herein in their entireties for their teachings of ionic liquids.

The term "liquid" describes the compositions that are generally in amorphous, non-crystalline, or semi-crystalline state. For example, while some structured association and packing of cations and anions can occur at the atomic level, an ionic liquid composition can have minor amounts of such ordered structures and are therefore not crystalline solids. The compositions can be fluid and free-flowing liquids or amorphous solids such as glasses or waxes at temperatures at or below about 150° C. In particular examples described herein, the ionic liquid compositions are liquid at the temperature at which the composition is applied (i.e., ambient temperature).

Further, the pulping liquid can be composed of at least two different ions, each of which can independently and simultaneously introduce a specific characteristic to the composition not easily obtainable with traditional dissolution and formulation techniques. Thus, by providing different ions and ion combinations, one can change the characteristics or properties of the disclosed compositions in a way not seen by simply preparing various crystalline salt forms.

Examples of characteristics that can be controlled in the disclosed compositions include, but are not limited to, melting, solubility control, rate of dissolution, and a biological activity or function. It is this multi-nature/functionality of the disclosed ionic liquid compositions which allows one to fine-tune or design in very specific desired material properties.

In some examples, the protic ionic liquid can comprise at least one cation and at least one anion. Examples of cations include, but are not limited to, ammonium, hydroxylammonium, 2-hydroxyethylammonium, piperidinium, imidazolium, pyrroldinium, morpholinium, protonated amino acids, and combinations thereof. Examples of anions include, but are not limited to, halides, acetates, alkyl carboxylates, and combinations thereof. In some examples, the protic ionic liquid is hydroxylammonium acetate. In some examples, the protic ionic liquid is 2-hydroxyethylammonium acetate.

It is further understood that the disclosed pulping liquids can include solvent molecules (e.g., water); however, these solvent molecules are not required to be present in order to form the ionic liquids. That is, these compositions can contain, at some point during preparation and application no or minimal amounts of solvent molecules that are free and not bound or associated with the ions present in the ionic liquid composition.

The disclosed protic ionic liquids can be substantially free of water in some examples (e g., immediately after preparation of the compositions and before any further application of the compositions). By substantially free is meant that water is present at less than about 10, 9, 8, 7, 6, 5, 4, 3, 2, 1, 0.5, 0.25, or 0.1 wt. %, based on the total weight of the composition.

The pulping liquids can, after preparation, be further diluted with solvent molecules (e.g., water) to form a solution suitable for application. Thus, the disclosed pulping liquids can be liquid hydrates, solvates, or solutions. It is understood that solutions formed by diluting ionic liquids, for example, possess enhanced chemical properties that are unique to ionic liquid-derived solutions.

The use of an ionic liquid salt is different and advantageous over the traditional pulping because: 1) smaller volumes of chemicals are used, 2) a shelf-stable and easily transportable salt is used, rather than solutions of acid and base, and 3) the pulping is performed in a single step as opposed to the traditional multi-step process. Thus, in certain examples herein, the pulping liquid is a protic ionic liquid, which is formed by the direct and reversible protonation of a base with a weak acid to form a salt.

In some examples, the protic ionic liquid is formed in situ by the addition of the acid and base. In some examples, the acid and base are used consecutively in "one-pot" process. The "one-pot" combination of the acid and base is different from traditional chitin pulping because waste shells are treated simultaneously with acid and base contrarily to the "traditional" process where shells are treated with acid in one step and base with a second step.

In some examples, the disclosed protic ionic liquids can be prepared by methods described herein. Generally, the particular cation(s) and anion(s) used to prepare an ionic liquid are selected as described herein. Then, with the particular cation(s) and anion(s) in hand, they can be combined, resulting in ionic liquid compositions as disclosed herein. The resulting ionic liquid can be then be used in the ionic liquid form or diluted in a suitable solvent as described herein. Additionally, the method for the preparation of the disclosed compositions can include the reaction in which two neutral species: an anion precursor (e.g., in the form of an inorganic acid, carboxylic organic acid, non-carboxylic acid, or Zwitterion species) and a cation precursor (e.g., inorganic base, organic base, Zwitterion species) are combined resulting in ionic liquids as disclosed herein. Again, such an ionic liquid can be used as is or diluted in an appropriate solvent. Still further, the disclosed protic ionic liquids can be prepared by mixing in solution cations and anions, wherein the cations and anions are capable of forming an ionic liquid, an ion pair, a hydrogen bonded species, a complex, eutectic mixture, or a cocrystal, albeit under different nonsolvating conditions. When the disclosed processes utilize pulping liquid that is a protic ionic liquid, the protic ionic liquid can be synthesized in a one-pot process from the reaction of a properly chosen base and a Brønsted acid (Scheme 1) to form a positively charged cation from the originally selected base and a negatively charged anion from the acid. The reaction can be conducted by combining the two components either with or without a solvent. Once combined the reaction proceeds quickly and results in the direct protonation of the base. If a solvent is utilized, upon removal of the solvent, an ionic liquid can be isolated.

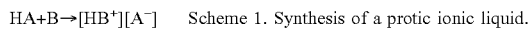
Scheme 1. Synthesis of a protic ionic liquid.

According to the methods and compositions disclosed herein, ion identification and combination, as disclosed herein, can involve any ion as long as the combination would result in a protic ionic liquid. As should be appreciated, the various combinations of ions according to the disclosed methods are numerous, and depend only on the desired combination of properties and whether the resulting ion combination is a protic ionic liquid as defined herein.

Also disclosed herein are methods for separating chitin from a chitinous biomass that contains chitin and non-chitin material, the methods comprising contacting the chitinous biomass with an acid and a base, in any order, to form a mixture. In some example, the mixture can comprise about 20 wt. % or less of the chitinous biomass. In other words, the chitinous biomass can be present in the acid and base composition at about 20 wt. % or less, e.g., about 15, 10, 5, or 1 wt. %. Also, in other examples, the chitinous biomass to chitin can be present in the acid and base composition at about 5 wt. % or more, e.g., about 10, 15, or 20 wt. %. In still other examples, the chitinous biomass can be present in the acid and base composition at from about 5 to about 30 wt. %, from about 5 to about 15 wt. %, from about 10 to about 30 wt. %, from about 10 to about 20 wt. %, or from about 15 to about 25 wt. %.

In some examples, the acid is added first to the chitinous biomass followed by the addition of the base. In some examples, the base is added first to the chitinous biomass followed by the addition of the acid. In some examples, the addition of the acid and base can form a protic ionic liquid (e.g., the protic ionic liquid is formed in situ).

Examples for the base component (e.g., the base used to prepare the pulping liquid) can include, but are not limited to, ammonia, n-alkylamine (e.g., trimethylamine, triethylamine, tripropylamine, tributylamine, dimethylamine, diethylamine, dipropylamine, dibutylamine), arylamine (e.g., benzylamine), hydroxylamine, 2-hydroxyethylamine, imidazole, 1-methylimidazole, pyrrolidine, piperidine, morpholine, 1-methyl-pyrrolidine, 1,2,3-triazole, 1,2,4-triazole, tetrazole, amino acids, and any combination thereof.

Examples for the acid component (e.g., the acid used to prepare the pulping liquid) can include, but are not limited to, alkylcarboxylic acids (e.g., formic acid, acetic acid, ethanonic acid, propanoic acid, butanoic acid, pentanoic acid, hexanoic acid, octanoic acid, decanoic acid, dodecanoic acid, fumaric acid, and citric acid), benzoic acid, methanesulfonic acid, para-toluenesulfonic acid, hydrochloric acid, hydrobromic acid, and hydroiodic acid, and any combination thereof.

In some examples, the acid is acetic acid and the base is 2-hydroxyethylamine. In some examples, the acid is acetic acid and the base is hydroxylamine.

In some examples, a majority of the non-chitin material from the chitinous biomass is removed from the chitinous biomass by the acid-base composition. In some examples, a majority of the chitin from the chitinous biomass is not dissolved in the acid-base composition and forms a residue.

In some examples, the residue can comprise at least about 30% and up to 100% chitin. In some examples, about 30 wt. % or more of the residue is chitin (e.g., about 35 wt. % or more, about 40 wt. % or more, about 45 wt. % or more, about 50 wt. % or more, about 55 wt. % or more, about 60 wt. % or more, about 65 wt. % or more, about 70 wt. % or more, about 75 wt. % or more, about 80 wt. % or more, about 85 wt. % or more, about 90 wt. % or more, or about 95 wt. % or more). In some examples, 100% or less of the residue is chitin (e.g., about 95 wt. % or less, about 90 wt. % or less, about 85 wt. % or less, about 80 wt. % or less, about 75 wt. % or less, about 70 wt. % or less, about 65 wt. % or less, about 60 wt. % or less, about 55 wt. % or less, about 50 wt. % or less, about 45 wt. % or less, about 40 wt. % or less, or about 35 wt. % or less).

The amount of chitin in the residue can range from any of the minimum values described above to any of the maximum values described above. For example, the residue can comprise from about 30 wt. % or more up to 100% chitin (e.g., from about 30 wt. % to about 65 wt. %, from about 65 wt. % to 100 wt. %, from about 30 wt. % to about 50 wt. %, from about 50 wt. % to about 70 wt. %, from about 70 wt. % to about 90 wt. %, from about 90 wt. % to 100 wt. %, from about 50 wt % to 100 wt. %, or from about 70 wt. % to 100 wt. %). In some examples, the residue is substantially comprised of chitin, meaning the residue comprises 99 wt. % or more chitin (e.g., 99.1 wt. % or more, 99.2 wt. % or more, 99.3 wt. % or more, 99.4 wt. % or more, 99.5 wt. % or more, 99.6 wt. % or more, 99.7 wt. % or more, 99.8 wt. % or more, or 99.9 wt. % or more).

In some examples, the degree of acetylation of the chitin can be 29% or more (e.g., 30% or more, 35% or more, 40% or more, 45% or more, 50% or more, 55% or more, 60% or more, 65% or more, 70% or more, 75% or more, 80% or more, 85% or more, 90% or more, or 95% or more). In some examples, the degree of acetylation of the chitin is 100% or less (e.g., 95% or less, 90% or less, 85% or less, 80% or less, 75% or less, 70% or less, 65% or less, 60% or less, 55% or less, 50% or less, 45% or less, 40% or less, 35% or less, or 30% or less).

The degree of acetylation of the chitin can range from any of the minimum values described above to any of the maximum values described above. For example, the degree of acetylation of the chitin can range from 29% to 100% (e.g., from 29% to 65%, from 65% to 100%, from 29% to 50%, from 50% to 70%, from 70% to 90%, from 90% to 100%, or from 60% to 100%).

In some examples, the methods can further comprise agitating the mixture. Agitating the mixture can be accomplished by any means known in the art. In some examples, agitating the mixture can comprise stirring the mixture.

In some examples, the methods can further comprise heating the mixture from about 20 to about 100° C. In some examples, the methods can further comprise heating the mixture at a temperature of about 20° C. or more (e.g., about 25° C. or more, about 30° C. or more, about 35° C. or more, about 40° C. or more, about 45° C. or more, about 50° C. or more, about 55° C. or more, about 60° C. or more, about 65° C. or more, about 70° C. or more, about 75° C. or more, about 80° C. or more, about 85° C. or more, about 90° C. or more, or about 95° C. or more). In some examples, the methods can further comprise heating the mixture at a temperature of about 100° C. or less (e.g., about 95° C. or less, about 90° C. or less, about 85° C. or less, about 80° C. or less, about 75° C. or less, about 70° C. or less, about 65° C. or less, about 60° C. or less, about 55° C. or less, about 50° C. or less, about 45° C. or less, about 40° C. or less, about 35° C. or less, about 30° C. or less, or about 25° C. or less).

The temperature at which the mixture is heated can range from any of the minimum values described above to any of the maximum values described above. For example, the methods can further comprise heating the mixture from about 20° C. to about 100° C. (e.g., from about 20° C. to about 60° C., from about 60° C. to about 100° C., from about 20° C. to about 40° C., from about 40° C. to about 60° C., from about 60° C. to about 80° C., from about 80° C. to about 100° C., or from about 30° C. to about 90° C.).

The process, for example, can be stopped when all or most of the non-chitin material from the chitinous biomass is dissolved in the pulping liquid, leaving the chitin from the chitinous biomass as a residue, which can then be isolated.

In some examples, the methods can further comprise centrifuging the mixture and isolating the residue.

In other words, in any of the disclosed methods, chitin can be isolated from the mixture of pulping liquid (e.g., the protic ionic liquid or acid base combination) and the chitinous biomass by centrifugation. The separated chitin material can then be washed with a solvent or mixture of solvents to ensure complete removal of the pulping liquid. In some cases the same solvent can be used to dissolve the residual non-chitin material and ionic liquid. In other cases the solvent can be different, which might require multiple washings with several solvents to fully purify the isolated chitin. Chitin is not soluble in any of the solvents selected for the washing step. Some suitable solvents include, but are not limited to methanol, ethanol, propanol, isopropanol, acetone, hexane, benzene, hexane, acetonitrile, water, and any combination thereof.

In some examples, the methods can further comprise washing the residue with a solvent or a mixture of solvents. The solvent or mixture of solvents can, for example, be chosen from methanol, ethanol, propanol, isopropanol, acetone, hexane, benzene, hexane, acetonitrile, water, and any combination thereof. In some examples, the solvent is water.

In some examples, chitin can be directly separated from a chitinous biomass, which contains chitin and non-chitin material, with an ionic liquid that is originally a solid when contacted with the chitin. In this method, the chitinous biomass can be contacted with the ionic liquid in its solid form. The resulting combination can be heated to the ionic liquid's melting point (e.g., from about 20 to about 100° C.) and optionally agitated. A majority of the non-chitin material from the chitinous biomass can then dissolve in or be removed by the ionic liquid and a majority of the chitin is not dissolved in the ionic liquid and forms a residue, which comprises at least about 30% and up to 100% chitin. The process can be stopped when all or most of the non-chitin material from the chitinous biomass is dissolved in the ionic liquid, leaving the chitin from the chitinous biomass as a residue, which can then be isolated.

In some examples, chitin can be directly separated from a chitinous biomass, which contains chitin and non-chitin material, by contacting the chitinous biomass with an acid and a base in either order. In a particular example, the chitinous biomass is contacted with an acids and then with a base. In another example, the chitinous biomass is contacted with a base and then an acid. A majority of the non-chitin material from the chitinous biomass can then dissolve in or removed by the ionic liquid and a majority of the chitin is not dissolved in the ionic liquid and forms a residue, which comprises at least about 30% and up to about 100% chitin. The process can be stopped when all or most of the non-chitin material from the chitinous biomass is dissolved in the ionic liquid, leaving the chitin from the chitinous biomass as a residue. The combination of chitinous biomass, acid, and base can be heated to from about 20 to about 100° C., and optionally agitated (e.g., stirred). The process can be stopped when all or most of the non-chitin material from the chitinous biomass is dissolved in the ionic liquid, leaving the chitin from the chitinous biomass as a residue, which can then be isolated.

In specific examples, the chitinous biomass can be contacted with hydroxylammonium acetate with the formula $[NH_3OH][CH_3COO]$. The mixture can be agitated and heated from about 20 to about 100° C. In another example, the chitinous biomass is contacted with the base ($NH_2OH$) and then with the acid ($CH_3COOH$) in "one-pot" process; alternatively, the chitinous biomass can be contacted with the acid ($CH_3COOH$) and then with the base ($NH_2OH$). The acids and bases disclosed herein can be similarly combined to form a protic ionic liquid or other type of pulping liquid and be used to separate chitin from a chitinous biomass as disclosed herein.

Compositions

Also disclosed herein are compositions produced upon contacting the pulping liquids like the protic ionic liquids and acid-base combinations disclosed herein and the chitinous biomass. For example, disclose is a crystalline chitin substantially free of $CaCO_3$, proteins, and fats.

For example, also disclosed herein are compositions comprising a chitinous biomass and a protic ionic liquid. The chitinous biomass can, in some examples, comprise an arthropod biomass, a fungi biomass, or a combination thereof. An arthropod biomass can, for example, comprise the exoskeleton of an arthropod. Examples of arthropods include, but are not limited to, shrimp, crabs, lobsters, insects, and any combination thereof. In some examples, the chitinous biomass can contain chitin and non-chitin material.

In some examples, the protic ionic liquid can comprise at least one cation chosen from ammonium, hydroxylammonium, 2-hydroxyethylammonum, piperidinium, imidazolium, pyrroldinium, morpholinium, and protonated amino acids. In some examples, the protic ionic liquid can comprise at least one anion chosen from halide, acetate, and alkyl carboxylate. In some examples, the protic ionic liquid is hydroxylammonium acetate. In some examples, the protic ionic liquid is 2-hydroxyethylammonium acetate.

In some examples, the chitinous biomass can comprise about 5 wt. % or more of the composition (e.g., about 10 wt. % or more, about 15 wt. % or more, about 20 wt. % or more, or about 25 wt. % or more). In some examples, the chitinous biomass can comprise about 30 wt. % or less of the composition (e.g., about 25 wt. % or less, about 20 wt. % or less, about 15 wt. % or less, or about 10 wt. % or less).

The amount of chitinous biomass in the composition can range from any of the minimum values described above to any of the maximum values described above. For example, the chitinous biomass can comprise from about 5 to about 30 wt. % of the composition (e.g., from about 5 wt. % to about 15 wt. %, from about 15 wt. % to about 30 wt. %, from about 5 wt. % to about 10 wt. %, from about 10 wt. % to about 15 wt. %, from about 15 wt. % to about 20 wt. %, from about 20 wt. % to about 25 wt. %, from about 25 wt. % to about 30 wt. %, or from about 10 wt. % to about 25 wt. %).

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), Sigma (St. Louis, Mo.), Pfizer (New York, N.Y.), GlaxoSmithKline (Raleigh, N.C.), Merck (Whitehouse Station, N.J.), Johnson & Johnson (New Brunswick, N.J.), Aventis (Bridgewater, N.J.), AstraZeneca (Wilmington, Del.), Novartis (Basel, Switzerland), Wyeth (Madison, N.J.), Bristol-Myers-Squibb (New York, N.Y.), Roche (Basel, Switzerland), Lilly (Indianapolis, Ind.), Abbott (Abbott Park, Ill.), Schering Plough (Kenilworth, N.J.), Akzo Nobel Chemicals Inc (Chicago, Ill.), Degussa Corporation (Parsippany, N.J.), Monsanto Chemical Company (St. Louis, Mo.), Dow Agrosciences LLC (Indianapolis, Ind.), DuPont (Wilmington, Del.), BASF Corporation (Florham Park, N.J.), Syngenta US (Wilmington, Del.), FMC Corporation (Philadelphia, Pa.), Valent U.S.A. Corporation (Walnut Creek, Calif.), Applied Biochemists Inc (Germantown, Wis.), Rohm and Haas Company (Philadelphia, Pa.), Bayer CropScience (Research Triangle Park, N.C.), or Boehringer Ingelheim (Ingelheim, Germany), or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989). Other materials can be obtained from commercial sources.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

All chemicals used were of analytical grade, purchased from Sigma-Aldrich (St. Louis, Mo.) or Alfa Aesar (Ward Hill, Mass.), and used without further purification unless otherwise noted. Chitinous biomass sources included raw and dried shrimp shells, crab meal, king crab body and legs (separated), crab shells, and lobster, and were obtained from a variety of sources. Tested Sources: a) Dried shrimp shells from the Gulf Coast Agricultural and Seafood Cooperative in Bayou La Batre, Ala. The dried material was pulverized with a hammer mill to particles 0.635 cm diameter and smaller. This dried, pulverized material was shipped to The University of Alabama; b) Crab meal from the Gulf Coast Agricultural and Seafood Cooperative in Bayou La Batre, Ala., processed in the same way as the dried shrimp shells; c) Shrimp Shells (Raw); d) Crab from Neptune's Harvest (Gloucester, Mass.); e) Lobster from Neptune's Harvest (Gloucester, Mass.).

Example 1: Hydroxylammonium Acetate ([NH$_3$OH][CH$_3$COO])

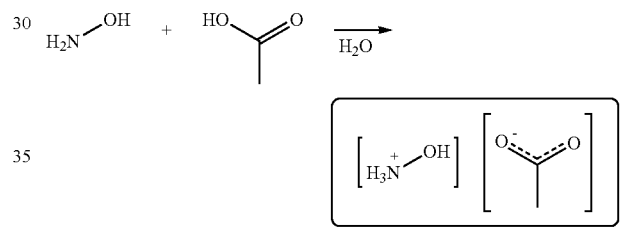

Hydroxylamine NH$_2$OH (276.7 g, 8.376 mol) as a 50% (w/w) solution in water (total solution mass 553.3 g) was cooled with magnetic stirring in 1 L round-bottom flask submersed in an ice bath. To the stirring solution was added 528.2 g (8.795 mol, 1.05 eq.) glacial CH$_3$COOH dropwise over the course of several hours. Upon the completed addition, the mixture was allowed to warm to room temperature and stirred overnight. The mixture was then purged with air, while being heated to 40° C. and magnetically stirred, to evaporate the water. Upon concentration of the solution, large amounts of a white crystalline solid precipitated. The solid was filtered, washed with a small amount of cold methanol (ca 100 mL) and diethyl ether (ca 100 mL) to remove any residual acetic acid, and dried under reduced pressure for 1 h. 619.243 g white solid was obtained (Yield=79.5%).

The IL [NH$_3$OH][CH$_3$COO] appeared as a white crystalline solid, which produces large monolith-type crystals with a melting point of 87° C. when recrystallized from water. (Upon the removal of the solvent under reduced pressure from [NH$_3$OH][CH$_3$COO], it was noticed that the compound appeared to sublime under reduced pressure, between 40-50° C., and recrystallize upon cooling.)

$^1$H NMR (360 MHz, DMSO-d6) δ (ppm): 8.58 (s, 4H), 1.86 (s, 3H). 1H NMR (360 MHz, D2O) δ (ppm): 1.68 (s, 3H). $^{13}$C NMR (360 MHz, DMSO-d6) δ 175.3, 22.7.

Example 2: 2-Hydoxylethylammonium Acetate ([NH$_3$(CH$_2$)$_2$OH][CH$_3$COO])

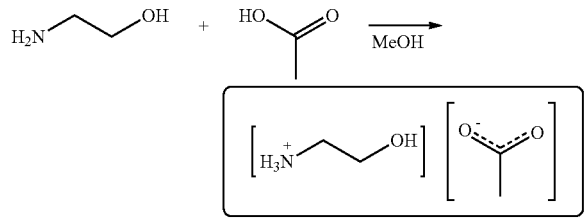

122.16 g (2.0 mol) ethanolamine and 100 mL MeOH were added to a 1 L round-bottom flask with magnetic stirring and cooled with an ice bath. 121.0 g (2.01 mol) of glacial acetic acid was added dropwise. Once the addition was complete, the reaction was stirred overnight and allowed to warm to room temperature. The solvent and residual acetic acid were removed under heat (50° C.) and reduced pressure. Light tan, viscous liquid remained. Upon placing in the freezer for several days and agitating with a glass stir rod, the product froze and remained solid when warmed to room temperature. Yield 197.1 g (81%).
$^1$H NMR (360 MHz, DMSO-d6) δ 7.39 (s, 4H), 3.52 (t, J=5.4 Hz, 2H), 2.76 (t, J=5.4 Hz, 2H), 1.73 (s, 3H). $^{13}$C NMR δ 175.1, 59.7, 42.5, 24.4

Example 3: Pulping Shrimp Shells with [NH$_3$OH][CH$_3$COO] (10 wt. % Chitinous Biomass)

1.0 g of ground shrimp shell waste (<250 μm particle size) was mixed at 10 wt. % with 9.02 g [NH$_3$OH][CH$_3$COO] in a round-bottom flask and heated in an oil bath to 100° C. with stirring. Upon heating, small amounts of condensation appeared on the top of the flask. Upon the first signs of the IL melting, a bubbling could be seen indicating a reaction. The IL continued to melt while a more vigorous bubbling/foaming could be observed. After approximately 1-1.5 h, the foaming subsided and 50 mL of DI water was added to dilute reaction mixture. The mixture was separated through centrifugation and the solid was washed with DI water (3-5×50 mL, depending on the clarity of the wash water). The solid was then dried in the oven at 110° C. 0.225 g of light brown solid remained (22.5% yield; the yield reported is based on the starting shrimp shell material. When taking into consideration the amount of chitin available in shrimp shells the yield is quantitative.) The solids were analyzed by FTIR and spectra matched previously reported literature values for chitin.

Example 4: Pulping Shrimp Shells with [NH$_3$(CH$_2$)$_2$OH][OAc] (10 wt. % Chitinous Biomass)

[NH$_3$(CH$_2$)$_2$OH][OAc] was used to chemically pulp shrimp shells. However, upon heating the mixture to the melting point of the IL, the mixture reacted and bubbled, but not as vigorously and did not create a foam as in the case of the [NH$_3$OH][CH$_3$COO]. 0.1174 g of a light brown solid remained after separation, washing, and drying (11.7% yield; the yield reported is based on the starting shrimp shell material. When taking into consideration the amount of chitin available in shrimp shells the yield is quantitative.) The material was analyzed by FTIR and spectra matched previously reported literature values for chitin. Chitin content of solid is tabulated below in Table 1.

Example 5: Pulping Shrimp Shells with the Addition of Acetic Acid (CH$_3$COOH) Followed by Hydoxylamine (NH$_2$OH) (2 wt. % Chitinous Biomass)

To a round bottom flask containing 0.161 g shrimp shells, 5.11 g of glacial acetic acid was added followed (in about 2-5 minutes) by 5.6 g of 50 wt. % NH$_2$OH aqueous solution (2.8 g of pure base). The solutions were stirred using a magnetic stir bar and refluxed (100° C.) for 8 h in a round bottom flask equipped with a condenser. After 8 hours, water (20 mL) was added to the solutions and the suspension was transferred into 50 mL centrifuge tube, where the pulped material was separated through centrifugation. After centrifugation, the supernatant was carefully decanted from precipitate using a disposable plastic pipette. Subsequently, ca. 45 mL of fresh DI water was added again, and the resultant suspension centrifuged. Centrifugation, aqueous phase decantation and fresh DI water addition steps were consecutively repeated five more times. After five total washes, the pulped material was placed on a glass Petri dish in an 80° C. oven overnight, collected into a 20 mL screw cap vial, and stored. 0.0424 g of pulped chitin was obtained (26.3%; the yield reported is based on the starting shrimp shell material. When taking into consideration the amount of chitin available in shrimp shells the yield is quantitative.) The material identity was confirmed by FTIR.

Example 6: Pulping Shrimp Shells with the Addition of CH$_3$COOH Followed by NH$_2$OH (2 wt. % Chitinous Biomass)

To a round bottom flask containing 0.161 g shrimp shells, 5.6 g of 50 wt. % NH$_2$OH aqueous solution (2.8 g of pure base) was added followed by addition of 5.11 g of acetic acid. The solution was refluxed (100° C.) for 8 h in a round bottom flask equipped with a condenser. During the reflux a large amount of foam was formed. After 8 h of reflux, water was added to the solutions and the suspension was transferred into 50 mL centrifuge tubes, where the pulped material was separated through centrifugation. After centrifugation, the supernatant was carefully decanted from precipitate using a disposable plastic pipette. Subsequently, ca. 45 mL of fresh DI water was added again, and the resultant suspension centrifuged. Centrifugation, aqueous phase decantation and fresh DI water addition steps were consecutively repeated five more times. After five total washes, the pulped material was placed on a glass Petri dish in an 80° C. oven overnight, collected into a 20 mL screw cap vial, and stored. 0.036 g of pulped material was obtained (22.3%; the yield reported is based on the starting shrimp shell material. When taking into consideration the amount of chitin available in shrimp shells the yield is quantitative.) FT-IR spectroscopy confirmed the material as chitin (the spectrum revealed a series of previously reported absorption bands typical for chitin (van Hoogmoed, et al., *J. Biomed. Mater. Res. A*, 67:172-178, 2003; Lawrie, et al., *Biomacromolecules* 8:2533-2541, 2007)).

Example 7: Pulping Shrimp Shells with the Addition of CH$_3$COOH Followed by NH$_2$OH (10 wt. % Chitinous Biomass)

To a round bottom flask containing 5.0101 g shrimp shells, 29.21 g of acetic acid was added followed by 31.976 g of 50 wt. % NH$_2$OH aqueous solution (15.988 g of pure base). Similarly to above, the solutions were refluxed (100° C.) for 8 h in a round bottom flask equipped with a condenser. After 8 hours, water was added to the solutions and the suspension was transferred into 50 mL centrifuge tubes, where the pulped material was separated through centrifugation. After centrifugation, the supernatant was carefully decanted from precipitate using a disposable plastic pipette. Subsequently, ca. 45 mL of fresh DI water was added again, and the resultant suspension centrifuged. Centrifugation, aqueous phase decantation and fresh DI water addition steps were consecutively repeated five more times. After five total washes, the pulped material was placed on a glass Petri dish in an 80° C. oven overnight, collected into a 20 mL screw cap vial, and stored. 1.5030 g of pulped material was obtained (29.9(4) % of two trials; the yield reported is based on the starting shrimp shell material. When taking into consideration the amount of chitin available in shrimp shells the yield is quantitative.) FT-IR spectroscopy confirmed the material as chitin (the spectrum revealed a series of previously reported absorption bands typical for chitin (van Hoogmoed, et al., *J. Biomed. Mater. Res. A*, 67:172-178, 2003; Lawrie, et al., *Biomacromolecules* 8:2533-2541, 2007)).

Example 8: Pulping Shrimp Shells with the Addition of NH$_2$OH Followed by CH$_3$COOH (10 wt. % Chitinous Biomass)

To a round bottom flask containing 5.0101 g of dried shrimp shells, 31.976 g of 50 wt. % hydroxylamine (NH$_2$OH) aqueous solution (15.988 g of pure base) was added followed (in 2-5 minutes) by the addition of 29.21 g of glacial acetic acid. The solution was stirred using a magnetic stir bar and refluxed (100° C.) for 8 h in a round bottom flask equipped with a condenser. During the reflux a large amount of foam was formed. After 8 h of reflux, water was added to the solutions and the suspension was transferred into 50 mL centrifuge tubes, where the pulped material was separated through centrifugation. After centrifugation, the supernatant was carefully decanted from precipitate using a disposable plastic pipette. Subsequently, ca. 45 mL of fresh DI water was added again, and the resultant suspension centrifuged. Centrifugation, aqueous phase decantation and fresh DI water addition steps were consecutively repeated five more times. After five total washes, the pulped material was placed on a glass Petri dish in an 80° C. oven overnight, collected into a 20 mL screw cap vial, and stored. 1.4155 g of pulped material was obtained (28.6(4) of two trials; the yield reported is based on the starting shrimp shell material. When taking into consideration the amount of chitin available in shrimp shells the yield is quantitative.) FT-IR spectroscopy confirmed the material as chitin (the spectrum revealed a series of previously reported absorption bands typical for chitin (van Hoogmoed, et al., *J. Biomed. Mater. Res. A*, 67:172-178, 2003; Lawrie, et al., *Biomacromolecules* 8:2533-2541, 2007)).

Example 9: Other Sources of Chitin Tested

Chemical pulping on sources other than dried shrimp shells (raw shrimp shells, crab meal, king crab body and legs (separated), crab shells, and lobster) was performed using [NH$_3$OH][CH$_3$COO] on all samples at a 10 wt. % loading and following the conditions described above in Example 3.

All pulping trials provided a light to very light solid material that was further characterized as chitin.

Example 10: Characterization of Chitin from Shrimp Shells

The pulped solids from each pulping experiment were fully characterized by measuring chitin content, FT-IRs, CaCO$_3$ content, PXRD, and degree of acetylation (DA). The pulped material was not entirely pure chitin, but contained CaCO$_3$, some proteins "trapped" in pulped product, silica, etc. Thus, in order to determine how much chitin exactly was contained in the pulped material under each sets of conditions, the chitin content was confirmed through the Black and Schwartz method (Black and Schwartz, Analyst 75:185-189, 1950), through elimination of inorganic salts (calcium carbonate) in 1M HCl acidic medium, and extraction of protein matter in 1.25M alkaline medium, followed by de-coloration step through acetone wash. The yield of reconstituted chitin was calculated using eq. 1:

$$\text{Chitin Reconstitution Yield wt } (\%) = \frac{m_p \times C_p}{m_{cb} \times C_{cb}} \quad (1)$$

where $m_p$ is the mass of dried recovered pulped chitin and $m_{cb}$ is the mass of chitinous biomass material. $C_p$ is the chitin content (wt. %) of the dried recovered pulped chitin, $C_{cb}$ is the chitin content (wt. %) of the chitinous biomass material.

The procedure was as follows: 0.5 g of pulped crude chitin was weighted into 100 mL round-bottom flask, and 50 mL of 1M hydrochloric acid was added. The flask was heated at 100° C. for 1 h with a condenser. At the end of this period, the flask was cooled down, the content transferred into 50 mL centrifuge tube and centrifuged at 3500 rpm for 10 minutes. After the pulped material was separated through centrifugation, the supernatant was carefully decanted from precipitate using a disposable plastic pipette. Subsequently, ca. 45 mL of fresh DI water was added again, and the resultant suspension centrifuged. Centrifugation, aqueous phase decantation, and fresh DI water addition steps were consecutively repeated several times until the washings were no longer acidic (pH ca 7).

The chitinous material was quantitatively transferred into 100 mL round-bottom flask, 50 mL of 1.25 M NaOH solution was added, and the mixture was refluxed at 100° C. for 1 h. At the end of this period, the flask was cooled down, the content transferred into 50 mL centrifuge tube and centrifuged at 3500 rpm for 10 minutes. After the pulped material was separated through centrifugation, the supernatant was carefully decanted from the precipitate using a disposable plastic pipette. Subsequently, ca. 45 mL of fresh DI water was added again, and the resultant suspension centrifuged. Centrifugation, aqueous phase decantation and fresh DI water addition steps were consecutively repeated several times until the washings were no longer basic (pH 7). Finally, the precipitate was washed twice with about 50 mL of acetone. The precipitate was then placed into the crucible and dried to constant weight at 110° C. At this point the residue at this stage contained chitin together with any silica present in the sample. Then the contents of the crucible were ashed in an electric muffle-furnace at a dull red heat (770-900° C.) until constant weight was achieved. The loss in weight was reported as chitin.

Chitin contents ranged from 59-75%, with an outlier of 30% for crab meal. Pulped material from king crab body and legs had the highest chitin content at 75 and 74%, respectively, and comparable to the material obtained from shrimp shells (CoOP). Pulped materials from lobster, raw shrimp shell, and crab shells all had slightly lower purities with 59, 60, and 63%. Though lower purities, the chitin recovery values are all high (>70% available chitin recovered, Table 1).

purification with 1 M HCl/1 M NaOH showed no effect on crystallinity. The high level of crystallinity suggested that the chemical pulping of the chitin from the shrimp shell matrix maintained the natural crystallinity of the material throughout the pulping processes, with no correlation to the pulping method. This is contrary to IL extraction process, where the chitin is dissolved and coagulated leaving the chitin amorphous.

TABLE 1

Chitin content of pulped biomass.

| PIL Chitin source | [NH$_3$OH][CH$_3$COO] | | | | | | | | | | [NH$_3$OH] [CH$_3$(CH$_2$)$_2$COO] Shrimp Shells (CoOP) |
|---|---|---|---|---|---|---|---|---|---|---|---|
| | Shrimp Shells (CoOP) | | | | Shrimp Shells (Raw) | Crab meal (CoOP) | King Crab Body | King Crab Legs | Crab (NH) | Lobster (NH) | |
| Mass Loading (%) | 10 | 20 | 30 | 50 | 10 | 10 | 10 | 10 | 10 | 10 | 10 |
| Chitin content in source (%) | 22(1) | 22(1) | 22(1) | 22(1) | 20(2) | 14(2) | 35(1) | 28.7(4) | 8.4(1) | 12(1) | 22(1) |
| Chitin content after pulping (%) | 83(5) | 78(1) | 64(1) | 30(1) | 60(3) | 30(4) | 75(1) | 74(7) | 63(1) | 59(2) | 26(1) |

| | ACID + BASE OR BASE + ACID SEQUENCE | | | |
|---|---|---|---|---|
| Chitin source | A sequence of acetic acid HOAc addition followed by hydroxylamine NH$_2$OH | | A sequence of hydroxylamine NH$_2$OH addition followed by acetic acid HOAc | |
| | Shrimp Shells (CoOP) | | | |
| Mass Loading (%) | 2 | 10 | 2 | 10 |
| Chitin content in source (%) | 22(1) | 22(1) | 22(1) | 22(1) |
| Chitin content after pulping (%) | — | 73.6(6) | — | 72.3(5) |

The chitin content of the material is comparable to commercially available pure chitin (81.8%) and practical grade (PG) chitin (78.9%) (Qin, et al. *Green Chem.*, 12:968-971, 2010) as well as to chitin reconstituted from the dissolution of chitinous materials into 1-ethyl-3-methylimidazolium acetate ([C$_2$mim][OAc]) such as raw shrimp shells (81.1%) and commercially available pure chitin (87.1%) and PG-chitin (84.7%).

Analysis by Powder X-Ray Diffraction (PXRD)

PXRD of the shrimp shells compared to the pulped material from each protic ionic liquid (PIL) provides additional support of the purification of the chitin through the disclosed pulping process. PXRD of the shrimp shells show 4 major peaks, 9.4, 11.9, 19.3, and 30° 2θ identified as α-chitin and CaCO$_3$ (30°). Upon pulping, the peaks at 9.4, 11.9, and 19.3° increased in their intensity and a peak at 26° appeared, while the peak at 30°, associated with CaCO$_3$ was no longer visible. The change in crystalline peaks corresponded to an increase in α-chitin concentration and removal of the inorganic CaCO$_3$ phase.

Analysis by powder X-ray diffraction (PXRD) of the chitin compared to the pulped material obtained through treatment with CH$_3$COOH then NH$_2$OH (A+B, acid+base) or treatment with NH$_2$OH then CH$_3$COOH (B+A, base+acid) also supported the purification of the chitin through the disclosed pulping process. Chitin isolated through treatment with NH$_2$OH followed by treatment with CH$_3$COOH was identical by PXRD to chitin isolated through treatment with CH$_3$COOH followed by treatment with NH$_2$OH. Additional PIL Pulping: 9.4, 11.9, 19.3, 26.5
Acid followed by Base: 9.13, 9.38, 9.72, 12.74, 19.29, 26.41, 38.52, 39.2, 39.91
Base followed by Acid: 9.13, 9.38, 9.72, 12.74, 19.29, 26.41, 38.52, 39.2, 39.91
Calculated: 9.38, 9.78, 12, 74, 16.51, 17.22, 17.88, 19.2', 20.54, 20.73, 20.91, 22.31, 23.43, 25.13, 25.62, 25.92, 26.40, 27.21, 27.68, 28.01, 28.41, 29.21, 29.71, 30.21, 31.47, 31.87, 32.30, 32.50, 33.58, 34.18, 34.42, 35.02, 35.28, 35.35, 36.14, 37.53, 37.75, 38.20, 40.23, 41.50, 42.11, 42.52, 43.01, 43.46, 43.66, 44.36, 45.03, 45.56, 45.91, 46.46, 46.83, 48.23, 48.43, 48.73, 49.21, 49.63.
Literature Data: α-chitin: four sharp crystalline reflections at 9.6, 19.6, 21.1, and 23.7°; β-chitin: two main sharp crystalline reflections at 9.1 and 20.3°.

Fourier Transform Infrared Spectroscopy, FT-IR

Compositional analysis of FT-IR spectra confirmed the presence of chitin and provided a support of the purification of the chitin through this pulping process. "Pulped" chitin FT-IRs are identical to chitin extracted with [C$_2$mim][OAc] and do not depend on PIL, "Acid+Base" or "Base+Acid" pulping process. No residual NH$_2$OH and CH$_{300}$H was found in the pulped chitin. Additional purification with HCl and NaOH did not affect FT-IR spectra. (Chitin, cm$^{-1}$: 3445, 3252, 3099, 2918, 2855, 1660, 1620, 1541, 1461, 1422, 1376, 1308, 1257, 1201, 1150, 1110, 1065.)

Thermal Gravimetric Analysis (TGA)—Determination of CaCO$_3$ Content.

Further analysis was conducted by thermal gravimetric analyses on at least two independent samples. TGA was used to quantify the CaCO$_3$ content as well as provide thermal decomposition temperature for the resulting materials. All chitinous biomass sources displayed similar decompositions (moisture, chitin, and $CaCO_3$), but varying percentages of mass loss. For example; thermal analysis of shrimp shells show several features, the moisture content at 75° C., a small decomposition following that (most likely from proteins or lipids), a large decomposition at ~250° C. (chitin), and another large decomposition at 700° C. (characteristic of $CaCO_3$ decomposition to CaO and $CO_2$).

Analysis of the pulped material with [$NH_3OH$][$CH_3COO$] and [$NH_3(CH_2)_2OH$][OAc] showed a simple trace with only one major decomposition step relating to chitin at 260° C. and 252° C., respectively, and suggested purer materials. However, the pulped material from [$NH_3(CH_2)_2OH$][OAc] also showed 5.4(5) % $CaCO_3$ in the final material, whereas the pulped material from [$NH_3OH$][$CH_3COO$] shows none. This indicates that [$NH_3(CH_2)_2OH$][OAc] does not produce enough acetic acid at a 10 wt. % loading to react completely with the available $CaCO_3$. This observation would indicate that the mass loading would need to be reduced in order to further purify the chitin during a one-pot process. In all cases, residual mass is present and can be attributed to silicates and ash that require further purification to remove.

and diluted with ~5 mL of DI water. The pH was recorded using a calibrated pH meter and was titrated with a standardized solution of NaOH (0.1 M), recording the pH at each addition. The equivalence point was determined from the first derivative of the plot of the pH as a function of the volume of NaOH added. Each sample was measured in duplicate.

Method 2

Chitin suspensions were prepared as in Czechowska-Biskup, et al. Progress on Chemistry and Application of Chitin, Volume XVII, 2012, p. 5, by adding a given mass of chitin (ca. 25-30 mg) to 5 mL of a 0.1 mol/L HCl solution, which remained under shaking at 800 rpm in a shaker for 2 h, at 37° C. Approximately 1.5 mL of solution was taken out, filtered through a syringe tip filter, and 1 mL of the filtered solution transferred into a clean vial (density of 0.1 M HCl is 1.004 g/mL so that 1.004 g of solution was transferred into a vial, and the exact mass of solution was recorded). The solution was diluted with 15 mL boiled DI water, titrated with 10-25 μL aliquots of 0.1 mol/L NaOH using a Hamilton 25 μL micro-syringe, allowed to equilibrate after every

TABLE 2

Calcium carbonate content of material pulped using [$NH_3OH$][$CH_3COO$] and [$NH_3(CH_2)_2OH$][$CH_3COO$] based on TGA analysis.

| PIL Chitin source | [$NH_3(CH_2)_2OH$][$CH_3COO$] Shrimp Shells (CoOP) | [$NH_3OH$][$CH_3COO$] | | | | |
|---|---|---|---|---|---|---|
| | | Shrimp Shells (CoOP) | Shrimp Shells (Raw) | Crab meal (CoOP) | King Crab Body | King Crab Legs |
| $CaCO_3$ content in source (%) | 26(1) | 26(1) | 12.5(1) | 32.5(4) | 10.3 | 30.5 |
| $CaCO_3$ content (%) | 5.4(5) | 0 | 0 | 0 | 0 | 0 |

| | ACID + BASE OR BASE + ACID SEQUENCE | | | |
|---|---|---|---|---|
| Chitin source | A sequence of acetic acid addition followed by hydroxylamine Shrimp Shells (CoOP) | | A sequence of hydroxylamine addition followed by acetic acid | |
| Mass Loading (%) | 2 | 10 | 2 | 10 |
| $CaCO_3$ content in source (%) | 26(1) | 22(1) | 22(1) | 22(1) |
| $CaCO_3$ content (%) | 0 | 0 | 0 | 0 |

The Degree of Acetylation (DA)

The degree of acetylation (DA) was measured on the pulped material to determine the ratio of chitin to chitosan, as this ratio has a large impact on the material properties of the final product. The theory behind the titration method is that a known amount of hydrochloric acid is added to the sample, and some of it is consumed by the amine groups of the deacetylated chitin. Then, one is titrating the amount of HCl that did not react. All the titrations were done in triplicate and boiled DI water was used in these experiments.

Method 1

To determine the degree of acetylation of the chitin materials, 25 mg of sample was added to a 1 dram vial along with 5 mL 0.1 M HCl. The mixtures were shaken at 75 rpm for 3 h at 25° C. A 4 mL aliquot of each sample was removed aliquot addition, and the pH recorded. The graph with the variation of pH versus the added volume of base was made and the neutral point of the titration at pH=7 was determined that corresponded to neutralization of HCl. The percent DA was calculated.

$$\% \ NH_2 = ((C_1V_1 - C_2V_2) \times 0.016)/G \quad (1)$$

$$DA = 100 - \% \ NH_2/9.94 \times 100\% \quad (2)$$

where: $C_1$ is HCl concentration in M, $C_2$ is NaOH concentration in M, $V_1$ is volume of HCl solution in mL, $V_2$ is volume of NaOH solution in mL, 0.016 is molecular weight of $NH_2$ in 1 mL of 0.1 M HCl in g, G is the sample weight in g.

TABLE 3

Degree of Acetylation (DA %).

| | [NH$_3$OH][CH$_3$COO] | | | | | | | | | [NH$_3$(CH$_2$)$_2$OH][CH$_3$COO] |
|---|---|---|---|---|---|---|---|---|---|---|---|
| PIL Chitin source | COOP Shrimp Shells | | | | Shrimp Shells (Raw) | Crab meal (CoOP) | King Crab Body | King Crab Legs | Crab (NH) | Lobster (NH) | COOP Shrimp Shells |
| Mass Loading (%) | 10 | 20 | 30 | 50 | 10 | 10 | 10 | 10 | 10 | 10 | 10 |
| DA (%) | 80(6) | 75(1) | 57(8) | — | 64(7) | 82(1) | 82(9) | 86(1) | 64(3) | 70(2) | 29(2) |

| ACID + BASE OR BASE + ACID SEQUENCE | | |
|---|---|---|
| | Acetic acid CH$_3$COOH addition followed by hydroxylamine NH$_2$OH | Hydroxylamine NH$_2$OH addition followed by acetic acid CH$_3$COOH |
| Chitin source | Shrimp Shells (CoOP) | |
| Mass Loading (%) | 10 | 10 |
| DA (%) | 8.2(5) × 10 | 8.6(2) × 10 |

Relative Viscosity Measurements of Chitin-IL Solutions

Method 1

Solutions were prepared at a 0.2 wt. % loading by dissolving 0.0252 g chitinous sample in 12 g [C$_2$mim][OAc] in a 20 mL vial. The mixtures were heated at 90° C. on a hot plate for 3 h with magnetic stirring and the solutions appeared clear. The chitin-IL solutions were then cooled to room temperature. The viscosity of the samples were measured using a ViscoLab 3000 by loading 1-2 mL of the prepared solution, loading the appropriate range piston, and allowing the machine to equilibrate to the chosen temperature (35±0.3° C.). Samples equilibration includes reported the average and error of five measured data points. The viscosities were measured on two independently loaded samples and the reported values are the average and standard deviation between the samples. The relative viscosities were calculated using eq. 2:

$$\eta_{rel} = \frac{\eta_s}{\eta_o} \quad \text{eq. 2}$$

where $\eta_{rel}$ is the relative viscosity, $\eta_s$ is the viscosity of the solution and $\eta_o$ is the viscosity of the solvent.

Method 2

Solutions were prepared at a 0.5 wt. % loading by dissolving 0.015 g chitinous sample in 3 g [C$_2$mim][OAc] in a 20 mL vial. The mixtures were heated at 90° C. on a hot plate for 3 h with magnetic stirring and the solutions appeared clear. The chitin-IL solutions were then cooled to room temperature. The viscosity of the samples were measured using a ViscoLab 3000 by loading 1-2 mL of the prepared solution, loading the appropriate range piston, and allowing the machine to equilibrate to the chosen temperature (35±0.3° C.). Samples equilibration includes reported the average and error of five measured data points. The viscosities were measured on two independently loaded samples and the reported values are the average and standard deviation between the samples. The relative viscosities were calculated using eq. 1:

$$\eta_{rel} = \frac{\eta_s}{\eta_o} \quad (1)$$

where $\eta_{rel}$ is the relative viscosity, $\eta_s$ is the viscosity of the solution and $\eta_o$ is the viscosity of the solvent.

TABLE 4

Relative Viscosity of Pulped Material[a]

| | [NH$_3$OH][CH$_3$COO] | | | A + B[b] | B + A[b] |
|---|---|---|---|---|---|
| Chitin source | Shrimp Shells (CoOp) | | | | |
| Mass Loading (%) | 10 | 30 | 50 | 10 | 10 |
| Relative Viscosity (Method 1) | 1.05 (1) | 0.99 (2) | 0.90 (2) | 1.03 (4) | 1.03 (3) |
| Relative Viscosity (Method 2) | 1.40 (2) | 1.40 (4) | 0.96 (3) | 1.27 (2) | 1.27 (3) |

[a]Measured by Visco Lab 3000 at 35° C.;
[b]A + B - equimolar amounts of acetic acid and hydroxylammonium hydroxide sequence,
B + A - equimolar amounts of hydroxylammonium hydroxide and acetic acid.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for separating chitin from a chitinous biomass that contains chitin and non-chitin material, comprising:
    contacting the chitinous biomass with a protic ionic liquid to form a mixture, wherein the protic ionic liquid comprises at least one cation chosen from hydroxylammonium and 2-hydroxyethylammonium, and at least one anion chosen from halide and a C1-C4 alkyl carboxylate; wherein a majority of the non-chitin material from the chitinous biomass is removed from the chitinous biomass by the ionic liquid, and a majority of the chitin from the chitinous biomass is not dissolved in the ionic liquid and forms a residue; wherein about 30 wt. % or more of the residue is chitin.

2. The method of claim 1, wherein the residue is about 70 wt. % or more chitin.

3. The method of claim 1, wherein the residue is greater than about 99 wt. % chitin.

4. The method of claim 1, wherein the chitinous biomass comprises an arthropod biomass, a fungi biomass, or a combination thereof.

5. The method of claim 4, wherein the arthropod biomass comprises the exoskeleton of an arthropod chosen from shrimp, crab, lobster, insect, and any combination thereof.

6. The method of claim 1, wherein the protic ionic liquid comprises at least one acetate anion.

7. The method of claim 1, wherein the protic ionic liquid is hydroxylammonium acetate or 2-hydroxyethylammonium acetate.

8. The method of claim 1, wherein the degree of acetylation of the chitin is 29% or more.

9. The method of claim 1, wherein the degree of acetylation of the chitin is 60% or more.

10. A method for separating chitin from a chitinous biomass that contains chitin and non-chitin material, comprising:
    contacting the chitinous biomass with an acid and a base, in any order, to form a mixture,
    wherein the acid is acetic acid and the base is 2-hydroxyethylamine or hydroxylamine,
    wherein a majority of the non-chitin material from the chitinous biomass is removed from the chitinous biomass by the acid-base composition, and a majority of the chitin from the chitinous biomass is not dissolved in the acid-base composition and forms a residue;
    wherein about 30% or more of the residue is chitin.

11. The method of claim 10, wherein the addition of the acid and base forms a protic ionic liquid.

12. The method of claim 10, wherein the residue is about 70 wt. % or more chitin.

13. The method of claim 10, wherein the residue is greater than about >99 wt. % chitin.

14. The method of claim 10, wherein the degree of acetylation of the chitin is 29% or more.

15. The method of claim 10, wherein the degree of acetylation of the chitin is 60% or more.

16. A composition, comprising:
    a chitinous biomass and a protic ionic liquid,
    wherein the chitinous biomass contains chitin and non-chitin material, wherein the protic ionic liquid comprises at least one cation chosen from hydroxylammonium and 2-hydroxyethylammonium, and at least one anion chosen from halide and a C1-C4 alkyl carboxylate, wherein the composition further comprises a mixture and a residue, the mixture comprising a majority of the non-chitin material from the chitinous biomass dissolved in the protic ionic liquid, and the residue comprising a majority of the chitin from the chitinous biomass not dissolved in the protic ionic liquid.

17. The composition of claim 16, wherein the chitinous biomass comprises an arthropod biomass, a fungi biomass, or a combination thereof.

18. The composition of claim 17, wherein the arthropod biomass comprises the exoskeleton of an arthropod chosen from shrimp, crab, lobster, insect, and any combination thereof.

19. The composition of claim 16, wherein the protic ionic liquid comprises at least one acetate anion.

20. The composition of claim 16, wherein the protic ionic liquid is hydroxylammonium acetate or 2-hydroxyethylammonium acetate.

21. The composition of claim 16, wherein the chitinous biomass is present at from about 5 to about 30 wt. % or less of the composition.

* * * * *